US010066925B2

(12) United States Patent
Kurtz et al.

(10) Patent No.: US 10,066,925 B2
(45) Date of Patent: Sep. 4, 2018

(54) POINT CLOUD PROCESSING APPARATUS AND METHOD

(71) Applicant: The Boeing Company, Chicago, IL (US)

(72) Inventors: Tyler Kurtz, Ladson, SC (US); Dennis R. Mathis, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 236 days.

(21) Appl. No.: 15/013,410

(22) Filed: Feb. 2, 2016

(65) Prior Publication Data

US 2017/0219336 A1    Aug. 3, 2017

(51) Int. Cl.
*G01B 11/03* (2006.01)
*G06T 7/00* (2017.01)
*G01B 11/06* (2006.01)

(52) U.S. Cl.
CPC .......... *G01B 11/03* (2013.01); *G01B 11/0616* (2013.01); *G06T 7/0004* (2013.01); *G06T 7/0028* (2013.01); *G06T 7/0085* (2013.01); *G06T 2207/10028* (2013.01); *G06T 2207/30108* (2013.01)

(58) Field of Classification Search
CPC ....... G01B 11/06; G01B 11/02; G01B 11/026; G01B 11/0616; G01B 11/22; G01B 11/306
USPC .................. 356/631, 3.02, 2, 237.5; 702/170
See application file for complete search history.

(56) References Cited

U.S. PATENT DOCUMENTS

| 2010/0110451 | A1* | 5/2010 | Biswas | G01B 11/0616 356/631 |
| 2012/0256919 | A1 | 10/2012 | Kitamura et al. | |
| 2013/0214178 | A1* | 8/2013 | Clark | G01B 11/25 250/459.1 |
| 2013/0260016 | A1* | 10/2013 | Georgeson | G01B 21/08 427/9 |
| 2014/0098094 | A1* | 4/2014 | Neumann | G06T 17/10 345/420 |

(Continued)

OTHER PUBLICATIONS

Besl et al., "A Method for Registration of 3-D Shapes," *IEEE Transactions on Pattern and Machine Intelligence*, vol. 14, No. 2 (1992).

(Continued)

*Primary Examiner* — Jonathan Han
(74) *Attorney, Agent, or Firm* — Walters & Wasylyna LLC

(57) ABSTRACT

A computer implemented method may include the steps of: (1) providing a first point cloud representative of at least a bare portion of a surface of an object relative to a reference portion of the surface, (2) providing a second point cloud representative of at least a coated portion of the surface relative to the reference portion, (3) registering the first point cloud and the second point cloud with respect to a common reference coordinate system, (4) registering a first reference portion subset of the first data points representative of the reference portion and a second reference portion subset of the second data points representative of the reference portion, and (5) calculating difference values indicative of a thickness of the surface coating based on differences between a coated portion subset of the second data points and a bare portion subset of the first data points.

20 Claims, 14 Drawing Sheets

(56) References Cited

U.S. PATENT DOCUMENTS

2014/0320491 A1\* 10/2014 Dai ..................... G06T 17/00
                                                    345/420
2015/0042716 A1\* 2/2015 Beier .................... B41J 3/4073
                                                    347/14

OTHER PUBLICATIONS

Rusu et al., "Fast 3D Recognition and Pose Using the Viewpoint Feature Histogram," *The 2010 IEEE/RSJ International Conference on Intelligent Robots and Systems* (2010).
Belongie et al., "Shape Matching and Object Recognition Using Shape Contexts," *IEEE Transactions on Pattern and Machine Intelligence*, vol. 24, No. 24 (2002).
Chen et al., "Object Modeling by Registration of Multiple Range Images," *Proceedings of the 1991 IEEE International Conference on Robotics and Automation* (1991).
Pomerleu et al., "Comparing ICP Variants on Real-World Data Sets," *Autonomous Robots*, vol. 34, No. 3 (2013).
Frome et al., "Recognizing Objects in Range Data Using Regional Point Descriptors," *Proceedings of the European Conference on Computer Vision (ECCV)* (2004).
Johnson, "Spin-Images: A Representation for 3-D Surface Matching," *Carnegie Mellon University Thesis* (1997).

\* cited by examiner

POINT CLOUD PROCESSING APPARATUS AND METHOD

FIELD

The present disclosure is generally related to point clouds and, more particularly, to apparatus and methods for processing point clouds, for example, to evaluate a thickness of a surface coating applied to a surface of an object.

BACKGROUND

Many manufacturing and/or repair processes include coating a surface of an object with a surface coating, such as paint. It may be desirable to monitor and/or evaluate the coating process, for example, by measuring the thickness of the surface coating. However, traditional measurement methods may not be suitable for the measurement of very thin surface coatings, such as surface coating less than approximately 100 micrometers. Further, many traditional measurement methods may not be capable of taking measurements of a surface coating applied to a non-metallic surface or object.

Accordingly, those skilled in the art continue with research and development efforts in the field of point cloud processing.

SUMMARY

In one example, the disclosed computer implemented method may include the steps of: (1) providing a first point cloud representative of at least a bare portion of a surface of an object relative to a reference portion of the surface, the first point cloud comprising first data points characterizing spatial attributes of at least the bare portion and the reference portion, (2) providing a second point cloud representative of at least a coated portion of the surface relative to the reference portion, the coated portion comprising the bare portion covered with a surface coating, and the second point cloud comprising second data points characterizing spatial attributes of at least the coated portion and the reference portion, (3) registering the first point cloud and the second point cloud with respect to a common reference coordinate system, (4) registering a first reference portion subset of the first data points representative of the reference portion and a second reference portion subset of the second data points representative of the reference portion, and (5) calculating difference values indicative of a thickness of the surface coating based on differences between a coated portion subset of the second data points and a bare portion subset of the first data points.

In another example, the disclosed apparatus may include a metrology instrument configured to acquire a point cloud representative of a portion of a surface of an object based on a measurement image taken of said portion of said surface, and to provide a first point cloud representative of at least a bare portion of the surface relative to a reference portion of the surface, the first point cloud comprising first data points characterizing spatial attributes of at least the bare portion and the reference portion, and provide a second point cloud representative of at least a coated portion of the surface relative to the reference portion, the coated portion comprising the bare portion covered with a surface coating, and the second point cloud comprising second data points characterizing spatial attributes of at least the coated portion and the reference portion, and a computer including a processor programmed with a set of instructions that, when executed by the processor, causes the processor to: (1) register the first point cloud and the second point cloud with respect to a common reference coordinate system, (2) register a first reference portion subset of the first data points representative of the reference portion and a second reference portion subset of the second data points representative of the reference portion, and (3) calculate difference values indicative of a thickness of the surface coating based on differences between a coated portion subset of the second data points and a bare portion subset of the first data points.

In yet another example, the disclosed computer program product may include a non-transitory computer readable medium, and program code, stored on the non-transitory computer readable medium, for: (1) acquiring a first point cloud representative of at least a bare portion of a surface of an object relative to a reference portion of the surface, the first point cloud comprising first data points characterizing spatial attributes of at least the bare portion and the reference portion, (2) acquiring a second point cloud representative of at least a coated portion of the surface relative to the reference portion, the coated portion comprising the bare portion covered with a surface coating, and the second point cloud comprising second data points characterizing spatial attributes of at least the coated portion and the reference portion, (3) registering the first point cloud and the second point cloud with respect to a common reference coordinate system, (4) registering a first reference portion subset of the first data points representative of the reference portion and a second reference portion subset of the second data points representative of the reference portion, and (5) calculating difference values indicative of a thickness of the surface coating based on differences between a coated portion subset of the second data points and a bare portion subset of the first data points.

Other examples of the disclosed apparatus and method will become apparent from the following detailed description, the accompanying drawings and the appended claims.

DETAILED DESCRIPTION

Figure 1:
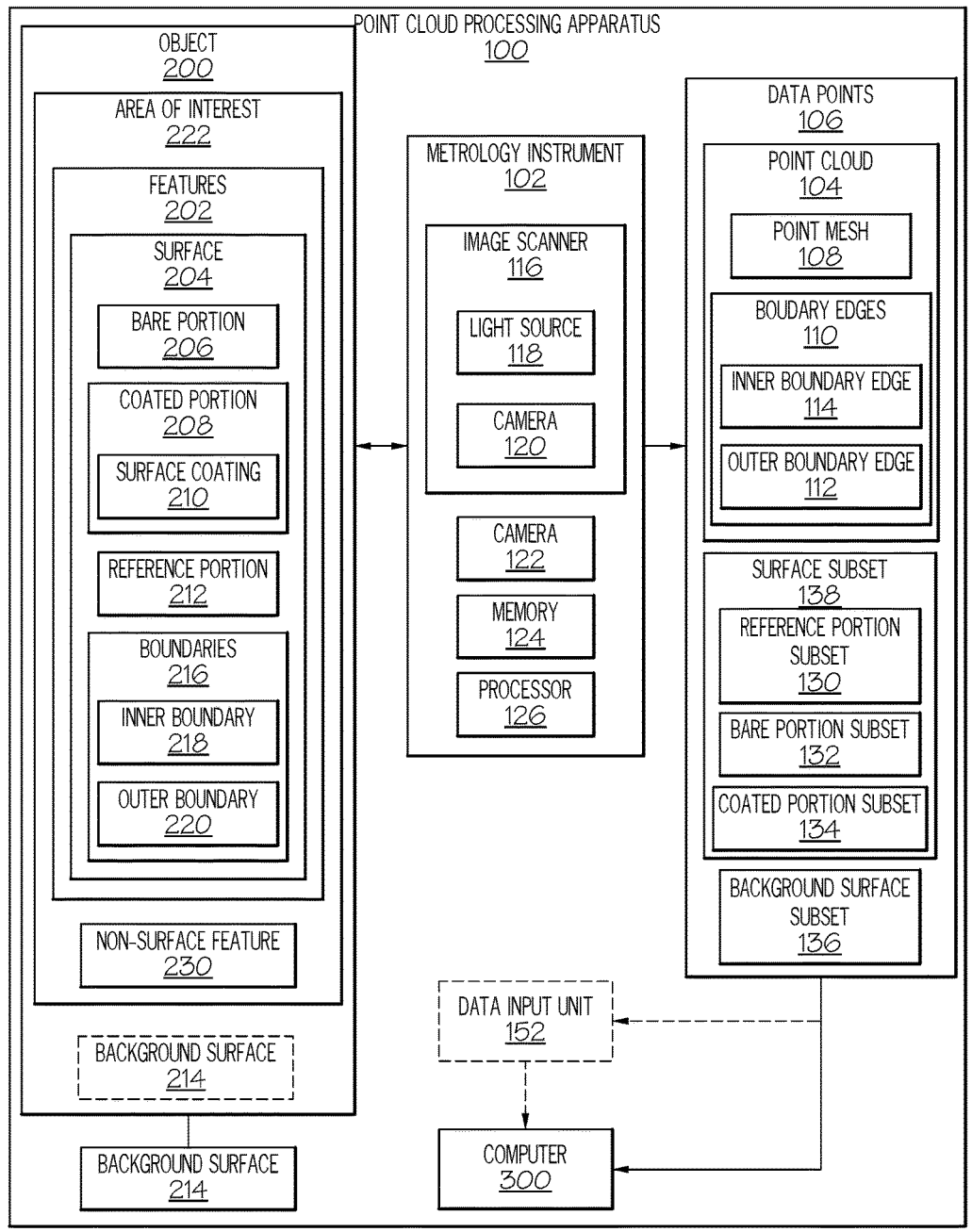
FIG. 1 is a schematic block diagram of one example of the disclosed point cloud processing apparatus.

The following detailed description refers to the accompanying drawings, which illustrate specific examples described by the disclosure. Other examples having different structures and operations do not depart from the scope of the present disclosure. Like reference numerals may refer to the same feature, element or component in the different drawings.

In FIGS. 1, 3, 19, and 21 referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1, 3, 19, and 21 may be combined in various ways without the need to include other features described in FIGS. 1, 3, 19, and 21, other drawing figures, and/or the accompanying disclosure, even though such combination or combinations are not explicitly illustrated herein. Similarly, additional features not limited to the examples presented, may be combined with some or all of the features shown and described herein.

In FIGS. 2, 4, 5, and 20, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 2, 4, 5, and 20 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

Reference herein to "example," "one example," "another example," or similar language means that one or more feature, structure, element, component or characteristic described in connection with the example is included in at least one embodiment or implementation. Thus, the phrases "in one example," "as one example," and similar language throughout the present disclosure may, but do not necessarily, refer to the same example. Further, the subject matter characterizing any one example may, but does not necessarily, include the subject matter characterizing any other example.

Illustrative, non-exhaustive examples, which may be, but are not necessarily, claimed, of the subject matter according the present disclosure are provided below.

Figure 2:
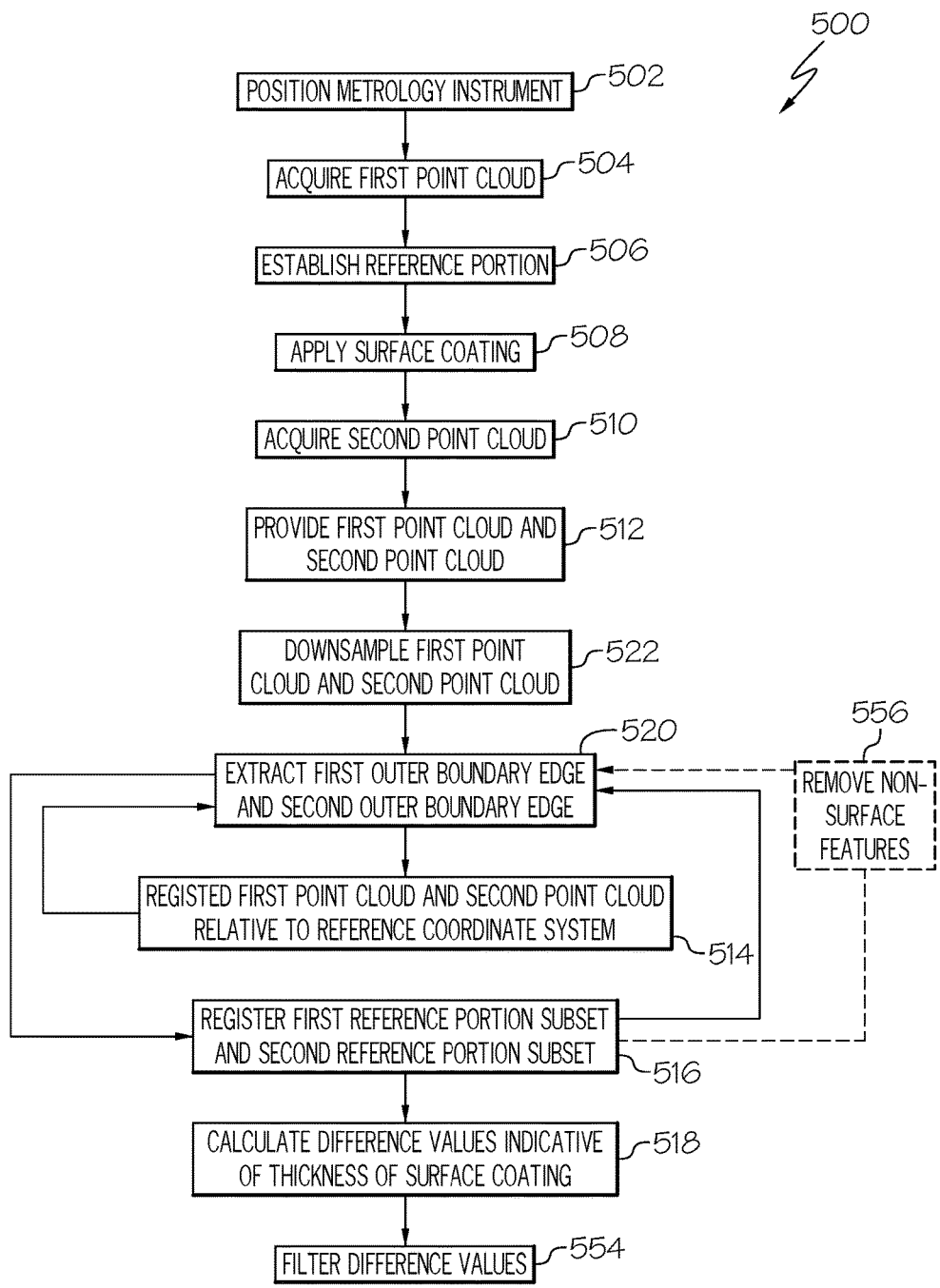
FIG. 2 is a flow diagram of one example of the disclosed method for processing a point cloud.

Referring to FIGS. 1 and 2, examples of the disclosed apparatus (e.g., apparatus 100) and method (e.g., method 500) described herein may be generally applicable to processing one or more point clouds or point meshes, or data in the form of point clouds or point meshes (also referred to as point cloud data). As used herein, the term "point cloud" refers to a set of data points (also referred to as measurement data or measured data points) in some reference coordinate system. As used herein, the term "point mesh" refers to the set of data points that has been organized into a data matrix based on one or more coordinate values. As one example, each data point may be a coordinate value that characterizes spatial attributes of an object, for example, surface features of the object. As one specific example, in a three-dimensional coordinate system, each data point is defined by an X, Y, Z coordinate (coordinate value). As one example, a very large number of data points (e.g., tens of thousands to tens of millions of data points) representing different points on an external surface of the object may be output as a point cloud (e.g., as a data file). As one example, the very large number of data points representing different points on an external surface of the object may be organized (e.g., converted) into a point mesh. Thus, as one example, a point cloud (or point mesh) may include a set of measured data points representing at least a portion of a surface of an object.

As one general example, the disclosed apparatus and method may be applicable to representation and/or characterization of the external surface of the object. As another general example, the disclosed apparatus and method may be applicable to generation of a three-dimensional ("3D") model representing the object and, more particularly, the external surface of the object. As another general example, the disclosed apparatus and method may be applicable to characterization and/or monitoring of the object throughout manufacturing and/or repair processes. As one specific example, the disclosed apparatus and method may be applicable to development and characterization of coating processes. As another specific example, the disclosed apparatus and method may be applicable to monitoring coating processes (or other manufacturing, remanufacturing, repair, and/or refurbishment processes). Thus, application of the apparatus and method disclosed herein may result in significant improvements in quality and/or accuracy of manufacture and/or a reduction in maintenance and repair.

Referring to FIG. 1, one example of a point cloud processing apparatus, generally designated apparatus 100, is disclosed. Apparatus 100 is one example of the disclosed apparatus for processing a point cloud 104 (e.g., point cloud data), for example, by comparing (e.g., two) different point clouds 104 to determine changes to one or more features 202 of object 200, for example, a thickness of surface coating 210 applied to surface 204 of object 200. In one example, apparatus 100 includes metrology instrument 102 and computer 300. Metrology instrument 102 may capture, as point cloud 104, data points 106 that characterize spatial attributes (e.g., as coordinate values) of features 202 of object 200. Computer 300 may processes point clouds 104.

In one example, metrology instrument 102 includes image scanner 116. Image scanner may generally include any suitable non-contact three-dimensional ("3D") scanner (also referred to as a 3D image sensor or 3D imaging sensor). As one example, image scanner 116 includes at least one light source 118 (e.g., light projector) and at least one camera 120. Image scanner 116 (e.g., light source 118 and camera 120) may be positioned in relation to surface 204 of object 200. Light source 118 projects light onto surface 204. Camera 120 captures an image of surface 204 located within a field of view of camera 120. Accordingly, metrology instrument 102 is configured to acquire a point cloud representative of a portion of a surface based on a measurement image taken of the portion of the surface. As one specific, non-limiting example, image scanner 116 may be a white light scanner, for example, including a white light source and a charge-coupled device ("CCD") camera. As another specific, non-limiting example, image scanner 116 may be a structured-light 3D scanner, for example, including a white light source and an infrared ("IR") camera.

In one example, computer 300 controls the entire apparatus 100. As examples, computer 300 may perform control and/or processing functions including, but not limited to, positioning and/or moving image scanner 116 relative to object 200, image capturing by image scanner 116, acquiring data points 106 from the captured image, recording data points 106 taken from metrology instrument 102, storing data points 106, generating point cloud 104 from data points 106, generating point mesh 108 from point cloud 104, performing calculations based on data points 106, and the like. In another example, metrology instrument 102 may include a separate controller 122, memory 124, and/or processor 126 configured to perform some or all control and/or processing functions. In yet another example, point cloud 104 (recorded data points 106) may be transferred and stored on data input unit 152. Data input unit 152 may be an external storage device such as a flash memory, magnetic storage (e.g., magnetic disk, floppy disk, recording tape), a digital optical disc (e.g., CD or DVD), or the like. Accordingly, and as examples, computer 300 may acquire data points 106 (e.g., in the form of point cloud 104) captured by metrology instrument 102, at least partially processed by processor 126 of metrology instrument 102, stored on internal memory 124 of metrology instrument 102, stored on data input unit 152, or the like.

Image scanner 116 may be stationary or may be in motion. As one example, image scanner 116 (e.g., stationary) may acquire, as a single frame, data points 106 representing surface 204 of object 200 located within area of interest 222, in the form of point cloud 104. As another example, image scanner 116 (e.g., moving) may scan area of interest 222 and acquire, as a plurality (e.g., sequence) of frames, data points 106 representing portions of surface 204 that when combined form the full surface 204, in the form of point cloud 104.

Although the example metrology instrument 102 illustrated in FIG. 1 includes only one image scanner 116, in other examples, a plurality of image scanners 116 may be utilized. As one example, a plurality of image scanners 116 (e.g., stationary and/or moving) may acquire, as a plurality (e.g., a sequence) of frames, data points 106 representing area of interest 222. The plurality of frames may be combined to form the entire area of interest 222 in the form of point cloud 104. The plurality of frames may be acquired at the same time or at different times. In various examples, image scanner 116 or the plurality of image scanners 116 may have respectively different locations and/or orientations relative to object 200 when acquiring data points 106.

In one example, apparatus 100 may extract one or more features 202 of object 200 based on point cloud 104 (e.g., data points 106) captured or taken of object 200. Generally, features 202 of object 200 may include three-dimensional features and/or two-dimensional features located within an area of interest (e.g., area of interest 222). As examples, the three-dimensional features may form three-dimensional shapes and the two-dimensional features may form shapes within flat planes and/or curved planes (hereinafter, simply referred to as planes). As one example, the three-dimensional features may be lines of intersections of the planes that differ from each other in position and/or direction. For example, the three-dimensional features may be outer edges of each plane or boundary edges between planes. As one example, the two-dimensional features are points and/or lines within the plane. Based on a measurement image (not explicitly illustrated) taken by image scanner 116 of surface 204 of object 200, the three-dimensional shapes and two-dimensional shapes represented by data points 106 of point cloud 104 (or point mesh 108) may be presented by different colors based on different vertical positions (e.g., different coordinate values on the Z-axis). As such, various image processing techniques may be used to process point clouds 104. The 3D model generated by apparatus 100 includes an approximate shape based on features 202 of object 200 and is, for example, formed from three-dimensional polylines including three-dimensional shapes and two-dimensional shapes.

As one example, feature 202 may be one or more surfaces 204 of object 200 located within area of interest 222. As used herein, surface 204 refers to (or includes) at least a portion of the exterior surface of object 200. As one example, surface 204 may include bare portion 206, coated portion 208, and/or reference portion 212. For example, surface 204 may include at least one of bare portion 206, coated portion 208, and/or reference portion 212, for example, at different stages in the coating process.

Bare portion 206 refers to a portion of surface 204 (e.g., the external or exposed surface) of object 200 having no surface coating 210. Coated portion 208 refers to a portion of surface 204 of object 200 having surface coating 210. As one example, coated portion 208 corresponds to the same portion of surface 204 that was previously bare portion 206, but now having surface coating 210. In other words, coated portion 208 is bare portion 206 coated with surface coating 210. Reference portion 212 refers to another portion of surface 204 of object 200 that remains unmodified during the coating process. As one example, reference portion 212 is a portion of surface 204 that remains uncoated (uncovered with surface coating 210).

Throughout the present disclosure, the term "coating process" includes any manufacturing, remanufacturing, repair, and/or refurbishment process in which surface coating 210 is applied to surface 204 of object 200 (e.g., bare portion 206 is covered with surface coating 210 to form coated portion 208). During the coating process, surface coating 210 may be sprayed, rolled, brushed, printed, dipped, deposited, or otherwise applied to surface 204 by any known application operation or method. Surface coating 210 may be functional, decorative, or a combination of both. As general, non-limiting examples, surface coating 210 may include protective coatings, optical coatings, adhesive coatings, and the like. As one specific, non-limiting example, surface coating 210 may be paint.

Depending upon the type and/or purpose of surface coating 210, once applied to surface 204, surface coating 210 may have a very small thickness (e.g., be very thin). As one example, surface coating 210 may have a thickness of between approximately 20 micrometers and approximately 100 micrometers. As another example, surface coating may have a thickness of less that approximately 20 micrometers. As yet another example, surface coating may have a thickness of more than approximately 100 micrometers. One advantage of and/or benefit provided by the disclosed apparatus 100 and method 500 is the ability to accurately characterize the coating process, for example, by calculating the thickness of a very thin (e.g., less than approximately 100 micrometers) surface coating 210. Current devices and methods for determining the thickness of a surface coating may not be suitable for use with very thin coatings.

In one example, apparatus 100 processes (e.g., compares) different point clouds 104 (e.g., two sets of data points 106) taken of the same object 200 at different points in the coating process (or another type of processing operation) to determine differences in features 202 (e.g., differences in the coordinate values of data points 106 representing the spatial attributes of surface 204). In one example, apparatus 100 may also generate the 3D model (not explicitly illustrated) according to features 202 based on point cloud 104.

Apparatus 100 (e.g., metrology instrument 102) may acquire first ones of data points 106 (identified hereinafter as first data points 106a) taken of and representing at least a portion of surface 204 of object 200 prior to the coating process (e.g., bare portion 206). Apparatus 100 (e.g., computer 300) may process first data points 106a as a first one of point clouds 104 (identified hereinafter as first point cloud 104a). Apparatus 100 (e.g., metrology instrument 102) may acquire second ones of data points 106 (identified hereinafter as second data points 106b) taken of and representing the same portion of surface 204 of object 200 following the coating operation (e.g., coated portion 208). Apparatus 100 (e.g., computer 300) may process second data points 106b as a second one of point clouds 104 (identified hereinafter as second point cloud 104b). Apparatus 100 (e.g., computer 300) may process first point cloud 104a and second point cloud 104b to determine (e.g., calculate) the thickness of surface coating 210 applied to surface 204 of object 200.

In some examples, first point cloud 104a and second point cloud 104b may also include first data points 106a and second data points 106b, respectively, taken of and representative of a portion of background surface 214. Background surface 214 may include any physical surface represented in point cloud 104 relative to, but not belonging to, surface 204 (e.g., behind object 200 and/or surface 204, adjacent to object 200 and/or surface 204, etc.). Accordingly, in one example, area of interest 222 may include the portions of surface 204 located within (e.g., bounded by) boundaries 216 (e.g., bare portion 206, coated portion 208, and/or reference portion 212) and at least a portion of background surface 214 located adjacent to or proximate to surface 204.

In one example, apparatus 100 acquires data points 106 representative of surface 204 of object 200 located within a particular area of interest 222 before and after the coating process. As one example, area of interest 222 includes the portions of surface 204 located within (e.g., bounded by) boundaries 216 (e.g., inner boundary 218 and outer boundary 220). In other words, the different portions of surface 204 within area of interest 222 (e.g., reference portion 212, bare portion 206, and/or coated portion 208) may be defined by boundaries 216. As one example, outer boundary 220 may define (or form) a perimeter edge of object 200. Prior to the coating process, bare portion 206 may include the portion of surface 204 located within inner boundary 218 (e.g., inner boundary 218 forms an outer border of bare portion 206). Following the coating process, coated portion 208 may include the portion of surface 204 located within inner boundary 218 (e.g., inner boundary 218 forms an outer border of coated portion 208). Prior to and following the coating process, reference portion 212 may include the portion of surface 204 located between outer boundary 220 and inner boundary 218 (e.g., outer boundary 220 forms an outer border and inner boundary 218 forms an inner border of reference portion 212).

In one example, apparatus 100 processes point clouds 104 to extract boundary edges 110 from within point cloud 104 representative of boundaries 216 of surface 204. As one example, different subsets of data points 106 may be grouped to represent different portions of surface 204 based on a relationship to boundary edges 110. Boundary edges 110 may include inner boundary edge 114 representative of inner boundary 218 and outer boundary edge 112 representative of outer boundary 220.

Referring to FIG. 2, one example of method 500 is disclosed. Method 500 is one example implementation of the disclosed method for processing point cloud 104 (e.g., point cloud data), for example, utilizing apparatus 100.

Modifications, additions, or omissions may be made to method 500 without departing from the scope of the present disclosure. Method 500 may include more, fewer, or other steps. Additionally, steps may be performed in any suitable order.

Generally, method 500 may process point clouds 104. Method 500 may compare different point clouds 104 to determine changes to surface 204 of object 200. Method 500 may calculate the thickness of surface coating 210 based on differences in data points 106 of the different point clouds 104.

Referring to FIG. 2, and with reference to FIG. 1, in one example, method 500 includes the step of positioning metrology instrument 102 relative to object 200, as shown at block 502. Object 200 may include surface 204. Surface 204 may include bare portion 206.

In one example, method 500 includes the step of acquiring first point cloud 104*a* based on a first measurement image taken (not explicitly identified) of bare portion 206, as shown at block 504. First data points 106*a* may be acquired, for example, by metrology instrument 102, and processed, for example, by computer 300, as first point cloud 104*a*. First data points 106*a* may be representative of points on at least bare portion 206 of surface 204. First data points 106*a* may also be representative of reference portion 212, for example, the portion of bare portion 206 that will not be covered with surface coating 210. First data points 106*a* may also be representative of points on background surface 214 within area of interest 222, for example, within field of view of camera 120.

Figure 3:
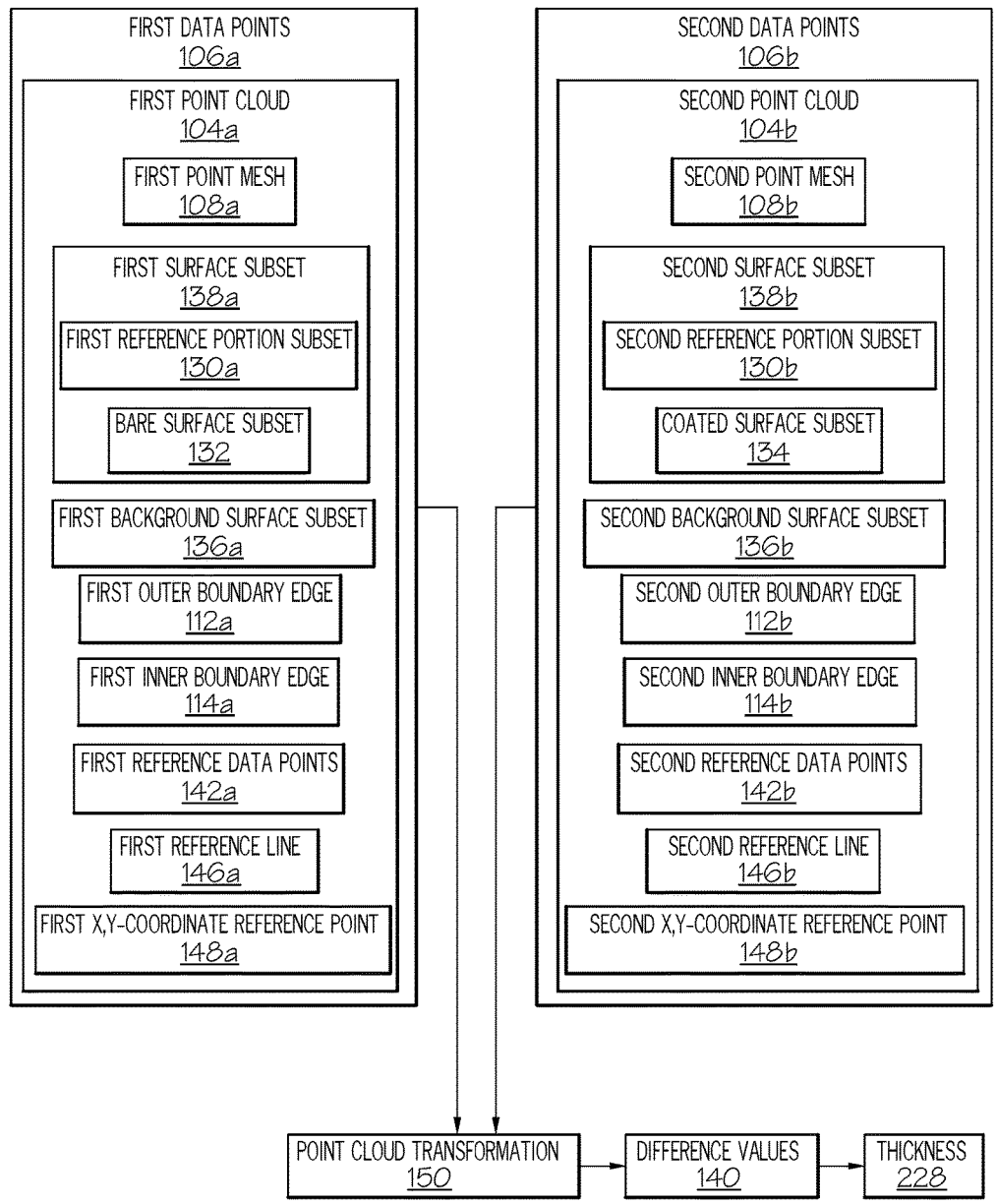
FIG. 3 is a schematic block diagram of one example of a first point cloud and a second point cloud that are processed to determined a thickness of a surface coating.

Referring to FIG. 3, and with reference to FIG. 1, in one example, first data points 106*a* include first surface subset 138*a* representative of surface 204 and first background surface subset 136*a* representative of background surface 214. In one example, first surface subset 138*a* includes first reference portion subset 130*a* representative of reference portion 212 and bare portion subset 132*a* representative of bare portion 206.

Referring to FIG. 2, and with reference to FIG. 1, in one example, method 500 includes the step of establishing reference portion 212 relative to bare portion 206, as shown at block 506. As one example, the step of establishing reference portion 212 includes the step of covering a portion of surface 204 (e.g., a portion of bare portion 206) to protect that portion of surface 204 from application of surface coating 210 such that reference portion 212 remains unmodified during the coating process. Establishing reference portion 212 may include masking the portion of surface 204 (e.g., a portion of bare portion 206) with a masking material (not explicitly illustrated).

Generally, the masking may be used to cover and protect from change a portion of surface 204 during the coating process in order to define (form) at least a portion of reference portion 212. In one example, the masking may define at least a portion of or the entirety of inner boundary 218 (e.g., the masking may extend radially inward from the perimeter edge of object 200 and/or surface 204). In one example, the masking may define at least a portion of or the entirety of outer boundary 220 (e.g., the masking may be applied up to the perimeter edge of object 200 and/or surface 204). In other words, the masking may be applied relative to, for example forming a perimeter around, bare portion 206.

As one example, the masking (e.g., the masking material) may be a solid mask, such as masking tape, a masking stencil, masking paper, and the like. As another example, the masking may be a liquid mask such as removable wax, latex, and the like.

In one example, method 500 includes the step of applying surface coating 210 to bare portion 206 to create coated portion 208 relative to reference portion 212, as shown at block 508.

In one example, method 500 includes the step of acquiring second point cloud 104*b* based on a second measurement image (not explicitly illustrated) taken of coated portion 208 and reference portion 212, as shown at block 510. Second data points 106*b* may be acquired, for example, by metrology instrument 102, and processed, for example, by computer 300, as second point cloud 104*b*. Second data points 106*b* may be representative of points on at least coated portion 208 of surface 204. Second data points 106*b* may also be representative of reference portion 212, for example, the portion of bare portion 206 that was not covered with surface coating 210. Second data points 106*b* may also be representative of points on background surface 214 within area of interest 222, for example, within field of view of camera 120.

Referring to FIG. 3, and with reference to FIG. 1, in one example, second data points 106*b* include second surface subset 138*b* representative of surface 204 and second background surface subset 136*b* representative of background surface 214. In one example, second surface subset 138*b* includes second reference portion subset 130*b* representative of reference portion 212 and coated portion subset 134 representative of coated portion 208.

Referring to FIG. 2, and with reference to FIGS. 1 and 3, in one example, method 500 includes the step of providing first point cloud 104*a* and second point cloud 104*b*, for example, to computer 300, as shown at block 512. First point cloud 104*a* may be representative of at least bare portion 206 of surface 204 of object 200 relative to reference portion 212 of surface 204. First point cloud 104*a* may include first data points 106*a* characterizing spatial attributes of at least bare portion 206 and reference portion 212. First point cloud 104*a* may also include first data points 106*a* characterizing spatial attributes of background surface 214. Second point cloud 104*b* may be representative of at least coated portion 208 of surface 204 relative to reference portion 212. Coated portion 208 may include bare portion 206 covered with surface coating 210. Second point cloud 10*b* may include second data points 106*b* characterizing spatial attributes of at least coated portion 208 and reference portion 212. Second point cloud 104*b* may also include second data points 106*b* characterizing spatial attributes of background surface 214.

Referring to FIG. 2, and with reference to FIG. 1, in one example, method 500 includes the step of downsampling first point cloud 104*a* and second point cloud 104*b*, as shown at block 522. As one example, the step of downsampling may include applying a box filter to first data points 106*a* and second data points 106*b* in order to reduce data density of first point cloud 104*a* and second point cloud 104*b*, respectively. As one example, all measured data points 106 (e.g., X, Y, and Z coordinates) located within a virtual cube of predetermined dimensions (e.g., 0.1 millimeter by 0.1 millimeter by 0.1 millimeter) may be averaged together to generate downsampled measurement data.

Referring to FIG. 2, and with reference to FIGS. 1 and 3, at various points throughout the disclosed method, method 500 may include the step of generating point mesh 108 from point cloud 104. Point cloud 104 (e.g., first point cloud 104*a* and/or second point cloud 104*b*) may be converted into point mesh 108 (e.g., first point mesh 108*a* and/or second point mesh 108*b*), for example, by computer 300.

Figure 6:
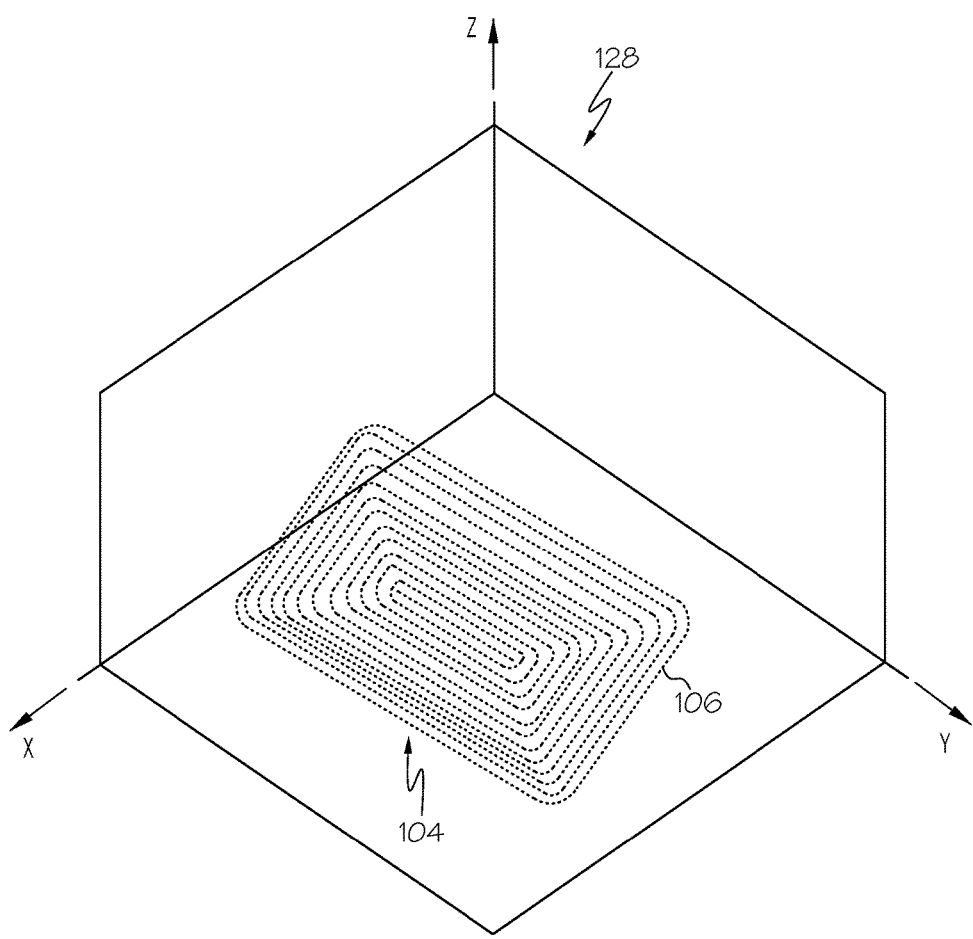
FIG. 6 is a schematic illustration of one example of a point cloud positioned within a reference coordinate system.
Figure 7:
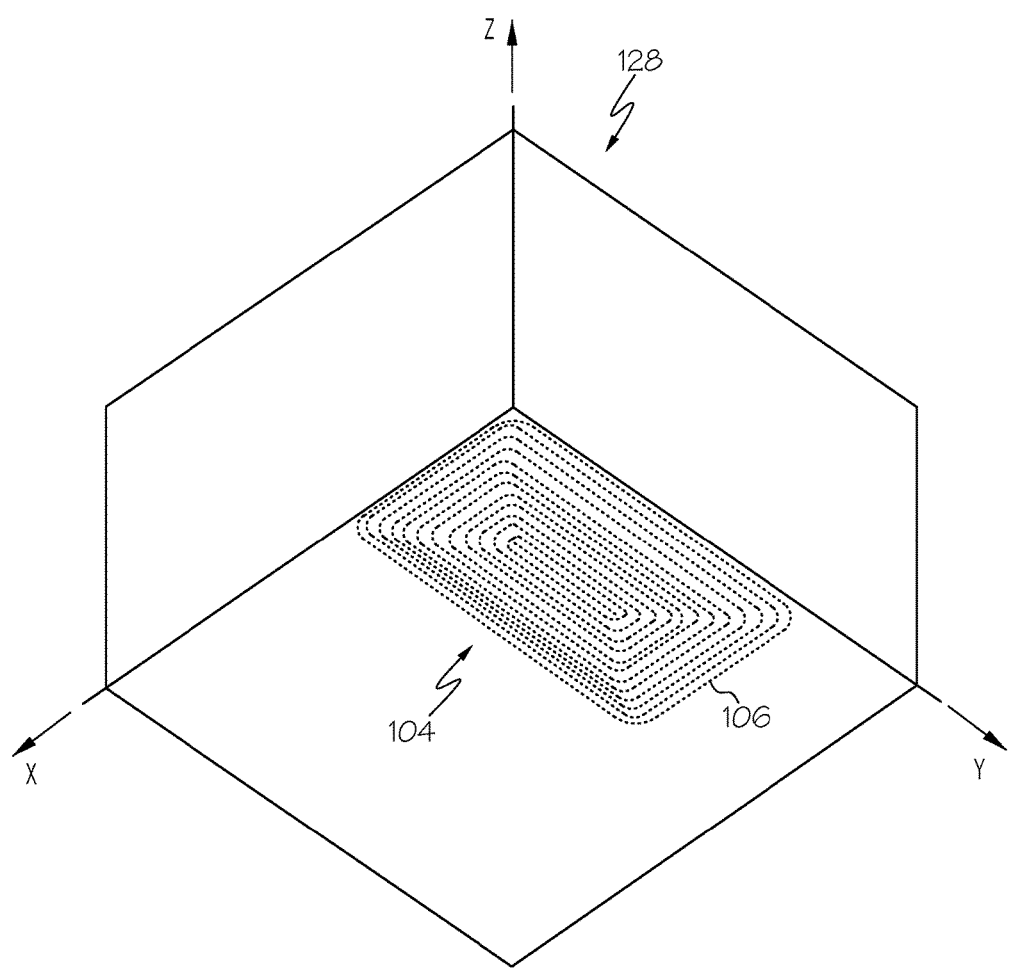
FIG. 7 is a schematic illustration of one example of the point cloud registered relative to the reference coordinate system.

Generally, point cloud 104 may have no structure and there may be no organization to data points 106. Therefore, manipulation and/or processing of data points 106 may be cumbersome and time consuming. For example, point cloud 104 may include a large list (e.g., file) of unorganized data points 106 each having X, Y, Z values (e.g., coordinate values). In order to more efficiently and accurately manipulate and process point cloud 104, data points 106 may organized into a data matrix of X, Y, Z values. In one example, data points 106 are organized relative to one another and into the data matrix based on X, Y coordinate values of each data point. For example, data points 106 may be organized from the lowest X, Y values to the highest X, Y values and, thus, placing each individual one of data points 106 relative to the X, Y-coordinates of reference coordinate system 128. As illustrated in FIGS. 6 and 7, reference coordinate system 128 is an X, Y, Z coordinate system (or other three-dimensional Cartesian coordinate system) and point cloud 104 may be represented by the organized matrix of data points 106 (e.g., point mesh 108). Therefore, method 500 may include the step of organizing data points 106 to convert point cloud 104 to point mesh 152.

Unless otherwise indicated, generally throughout the present disclosure and, particularly in FIGS. 6-13, point cloud 104 may be representative of first point cloud 104a and/or second point cloud 104b. Similarly, unless otherwise indicated, throughout the present disclosure point mesh 108 may be representative of first point mesh 108a and/or second point mesh 108b. Further, unless otherwise indicated, throughout the present disclosure first point mesh 108a may correspond to an organized first point cloud 104a and/or second point mesh 108b may correspond to an organized second point cloud 104b.

Additionally, unless otherwise indicated, throughout the present disclosure, operational steps of method 500 described as being applied to point cloud 104 may equally be applied to point mesh 108 (e.g., point cloud 104 consisting of data points 106 organized into a matrix). As examples, the steps of method 500 where point cloud 104 may be translated, rotated, scaled, and the like (e.g., registering, transforming, etc.), for example, relative to another point cloud 104 or reference coordinate system 128 may be equivalently interpreted as point mesh 108 being translated, rotated, scaled, etc., for example, relative to another point mesh 108 or reference coordinate system 128.

As one example, upon generation of point mesh 108 (e.g., conversion of point cloud 104 to point mesh 108), various rigid body transformations and/or non-rigid body transformations may be performed on point mesh 108 in order to align point mesh 108 relative to reference coordinate system 128 and match and/or align the two point meshes 108 relative to each other. In order to align one point mesh 108 (e.g., first point mesh 108a and/or second point mesh 108b) with reference coordinate system 128 and/or with another point mesh 108 (e.g., first point mesh 108a and/or second point mesh 108b), one or more rigid body transformations and/or one or more non-rigid body transformations may be applied to (e.g., performed on) point mesh 108. The rigid body transformation may fix all of data points 106 relative to one another. In such a manner, point mesh 108, as a whole, may be manipulated (e.g., rotated, translated, scaled, etc.).

Referring to FIG. 2, and with reference to FIGS. 1 and 3-5, in one example, method 500 includes the step of registering first point cloud 104a and second point cloud 104b with respect to common reference coordinate system 128 (FIGS. 6 and 7), as shown at block 514.

One advantage of and/or benefit provided by the disclosed apparatus 100 and method 500 is the ability to improve accuracy in the process of matching two point clouds (e.g., first point cloud 104a and second point cloud 104b). Improved matching accuracy may facilitate improved calculations based on the difference between the coordinate values (e.g., Z-coordinate values) of the two sets of data points 106 (e.g., first data points 106a and second data points 106b).

As one example, due to various limitations related to the measurement process (e.g., the relative position of image scanner 116 and/or object 200, object 200 not being on a completely flat base surface, surface 204 being at an incline or decline, and the like) during data point measurement, the X, Y, Z-coordinates of each one of data points 106 represented in each one of point clouds 104 (e.g., point meshes 108) may not be equivalently aligned along the common reference coordinate system 128 in order to calculate an accurate Z-value, for example, as illustrated in FIG. 6, and, thus, making accurate fine calculations between different ones of point cloud 104 difficult.

Referring to FIGS. 6 and 7, in one example, the registering step (block 514) may include adjusting for roll, pitch, and/or yaw of point cloud 104 in order to set common base X, Y, Z-values for data points 106 of each one of point clouds 106. As one example, each one of point clouds 104 may be rotated about the X-axis and/or the Y-axis in order to position each one of point clouds 104 approximately parallel to the X-Y plane (e.g., perpendicular to the Z-axis). As another example, each one of point clouds 104 may be rotated about the Z-axis in order to position each one of point clouds 104 may be approximately parallel to one of the X-axis or the Y-axis. As another example, each one of point clouds 104 may be translated along the Z-axis to align each one of point clouds 104 with a common Z-coordinate (e.g., Z=0). As another example, each one of point clouds 104 may be translated along the X-axis to align each one of point clouds 104 with a common X-coordinate (e.g., X=0). As another example, each one of point clouds 104 may be translated along the Y-axis to align each one of point clouds 104 with a common Y-coordinate (e.g., Y=0). Following the registering step (block 514), each one of point clouds 104 may be aligned with the common reference coordinate system 128, as illustrated in FIG. 7.

FIGS. 6 and 7 illustrate point cloud 104 (e.g., first point cloud 104a and/or second point cloud 104b). Point cloud 104 may include a very large number of data points 106 (e.g., first data points 106a and/or second data points 106b). In FIGS. 6 and 7, only a limited number of data points 106 are illustrated by example and for clarity, for example, of surface subset 138 representative of surface 204 (e.g., reference surface subset 130 representative of reference surface 212 and bare portion subset 132 representative of bare portion 206 or coated portion subset 134 representative of coated portion 208) and/or background portion subset 136 representative of background surface 214.

Similarly, FIGS. 8-13 also illustrate point cloud 104 (e.g., first point cloud 104a and/or second point cloud 104b). Point cloud 104 may include a very large number of data points 106 (e.g., first data points 106a and/or second data points 106b). In FIGS. 8-13, only a limited number of data points 106 are illustrated by example and for clarity, for example, data points 106 marking outer boundary edge 114 representative of outer boundary 220 and inner boundary edge 112 representative of inner boundary 218. Those skilled in the art will recognize that while not illustrated in FIGS. 8-13, point cloud 104 also includes data points 106 of surface subset 138 (e.g., reference surface subset 130 and bare portion subset 132 or coated portion subset 134) and/or background portion subset 136.

Figure 4:
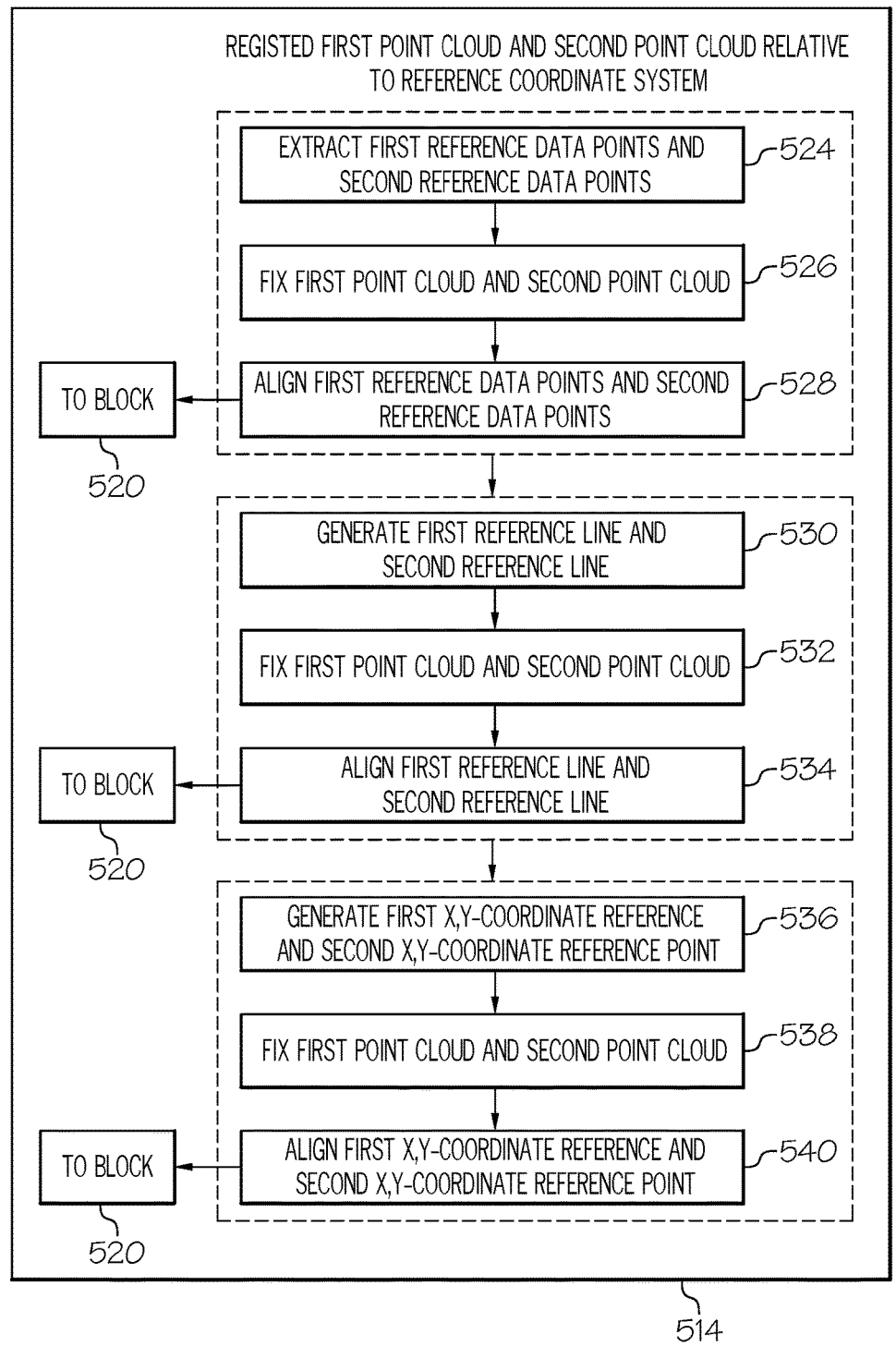
FIG. 4 is a flow diagram of one example of the first registering step of the method of FIG. 2.

Referring to FIG. 4, and with reference to FIGS. 1, 2, 8 and 9, in one example, the registering step (block 514) includes the step of extracting (e.g., selecting) three first reference data points 142a from first background surface subset 136a and three second reference data points 142b from second background surface subset 136b, as shown at block 524. In one example, the registering step (block 514) includes the step of fixing first point cloud 104a relative to first reference data points 142a and second point cloud 104b relative to second reference data points 142b, as shown at block 526. In one example, the registering step (block 514) includes the step of aligning first reference data points 142a and second reference data points 142b with a common Z-coordinate of reference coordinate system 128 to register first point cloud 104a and second point cloud 104b relative to the Z-axis, as shown at block 528.

Figure 9:
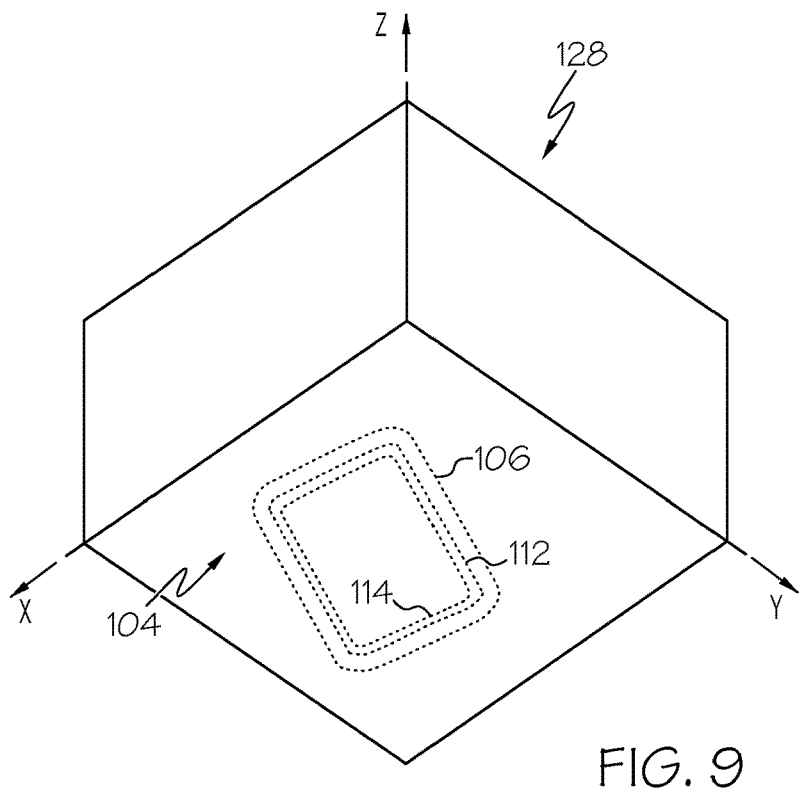
FIG. 9 is a schematic illustration of one example of the point cloud of FIG. 7 registered relative to a Z-axis of the reference coordinate system.

In one example, once reference data points 142 are extracted (block 524), the aligning step (block 528) includes rotating the entire point cloud 104 (e.g., a rigid body transformation) about the X-axis and/or the Y-axis to orient and position reference data points 142 at the Z-coordinate of reference coordinate system 128 and, thus, orienting point cloud 104 approximately parallel to the X, Y-plane, as illustrated in FIG. 9. In other words, the Z-values of data points 106 of point cloud 104 may be adjusted (e.g., increased or decreased) proportionally in the amount required to change the Z-values of reference data points 142 to the predetermined Z-coordinate. As one example, the Z-coordinate may be zero (Z=0).

In another example, reference plane 144 (FIG. 8) may be generated from reference data points 142 relative to point cloud 104. Reference base plane 160 may be a plane that shares the three reference data points 142. As one example, point cloud 104 may be fixed relative to reference plane 144 and reference plane, along with point cloud 104, may be rotated and/or translated to align reference plane to be parallel with the X, Y-plane and at a predetermined Z-coordinate value. As one example, the Z-coordinate value may be zero.

Thus, the registering step (block 514) may orient point cloud 104 relative to the Z-axis by rotating point cloud 104 about the X-axis and/or the Y-axis (e.g., adjusting for pitch and/or roll). In one example, three reference data points 142 (each having X, Y, Z-values) may be extracted from point cloud 104, for example, by exploiting a portion or subset of data points 106 having values located inside outer boundary edge 112 (e.g., between outer boundary edge 112 and inner boundary edge 114) and/or outside outer boundary edge 112, for example, representing at least one of reference portion 212 and background surface 214. As one example, reference data points 142 may be taken from data points 106 representing reference portion 212 (e.g., from reference portion subset 130). In another example, reference data points 142 may be taken from data points 106 representing background surface 214 (e.g., background surface subset 136). In another example, some of reference data points 142 may be taken from data points 106 representing reference portion 212 (e.g., from reference portion subset 130) and other of reference data points 142 may be taken from data points 106 representing background surface 214 (e.g., background surface subset 136). Thus, in order to extract reference data points 142, subsets of data points 106 representing different portion of surface 204 (e.g., reference portion 212) and background surface 214 may be identified by extraction of outer boundary edge 112 (block 520), as will be described in more detail herein.

Referring to FIG. 4, and with reference to FIGS. 1, 2, 10 and 11, in one example, the registering step (block 514) includes the step of generating first reference line 146a corresponding to a portion of first outer boundary edge 112a and second reference line 146b corresponding to a portion of second outer boundary edge 112b, as shown at 530. In one example, the registering step (block 514) includes the step of fixing first point cloud 104a relative to first reference line 146a and second point cloud 104b relative to second reference line 146b, as shown at block 532. In one example, the registering step (block 514) includes the step of aligning first reference line 146a and second reference line 146b with one of a common X-coordinate or Y-coordinate of reference coordinate system 128 to register first point cloud 104a and second point cloud 104b to one of the X-axis or the Y-axis, as shown at block 534.

Thus, the registering step (block 514) may orient point cloud 104 relative to one of the X-axis or the Y-axis by rotating point cloud 104 about the Z-axis (e.g., adjusting for yaw). Reference line 146 may be generated by exploiting a portion or subset of data points 106 representing outer boundary 220 (e.g., data points 106 of outer boundary edge 112). As one example, once data points 106 of outer boundary edge 112 (e.g., representing the three-dimensional outer boundary 220) are detected and extracted (block 520), a mathematical algorithm may be utilized to detect a portion or section of outer boundary edge 112 that is straight. As one example, reference line 146 is a line that shares data points representing a straight portion or section of outer boundary edge 112. As one specific, non-limiting example, a random sample consensus ("RANSAC") operator may be used to generate reference line 146.

Figure 10:
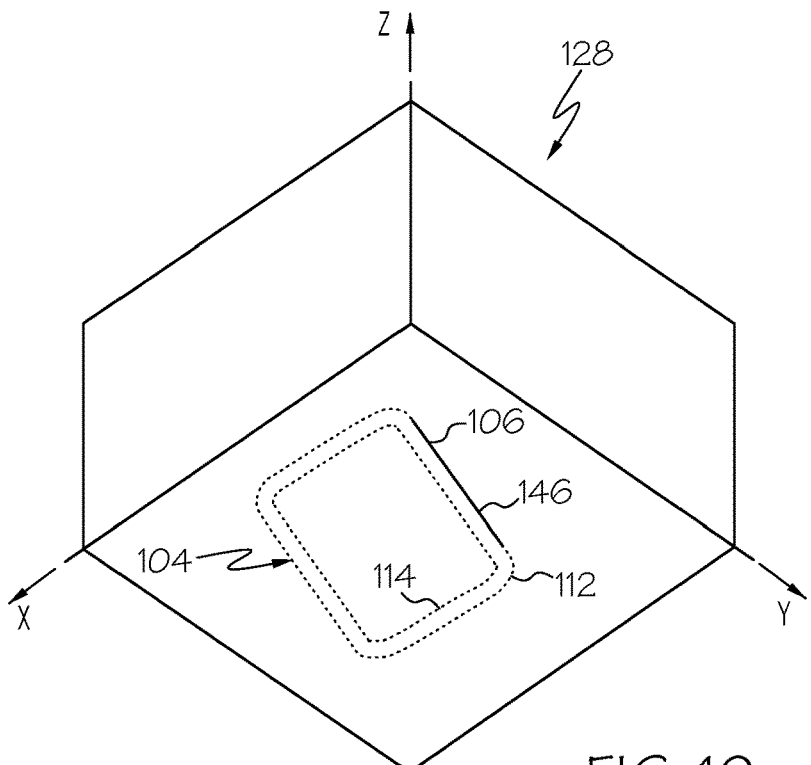
FIG. 10 is a schematic illustration of one example of the point cloud positioned within the reference coordinate system.
Figure 11:
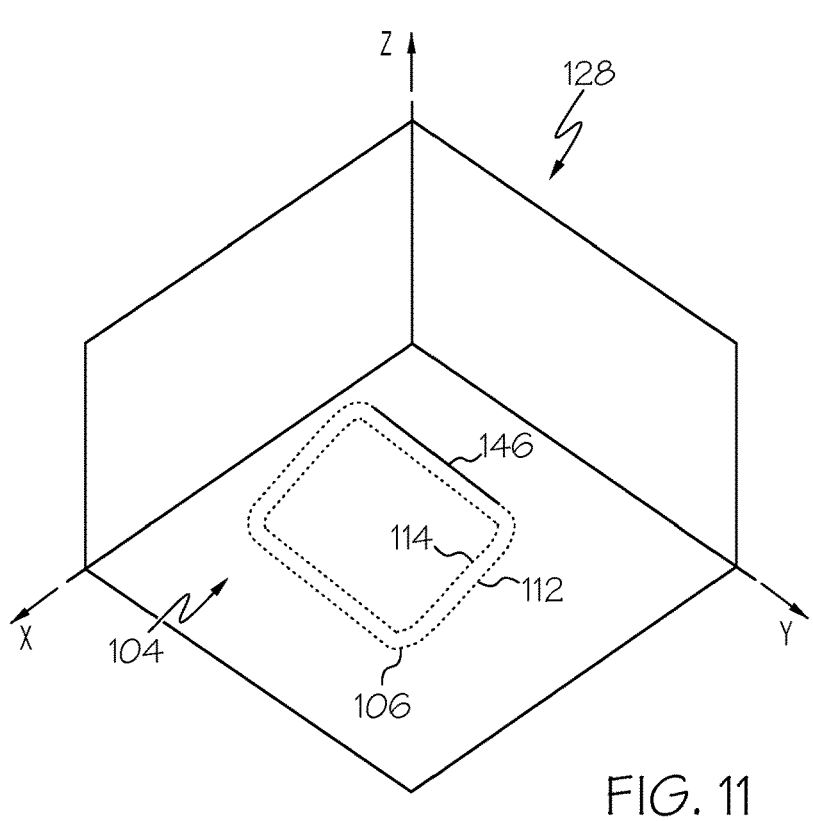
FIG. 11 is a schematic illustration of one example of the point cloud of FIG. 10 registered relative to a Y-axis of the reference coordinate system.

In one example, once reference line 146 has been generated (e.g., detected) (block 530), the alignment step (block 534) includes rotating the entire point cloud 104 (e.g., a rigid body transformation) about the Z-axis to orient and position all data points 106 forming reference line 146 along a common X-coordinate value (e.g., approximately parallel to the Y-axis), as illustrated in FIGS. 10 and 11, or along a common Y-coordinate value (e.g., approximately parallel to the X-axis) and, thus, orienting point cloud 104 relative to the Y-axis (e.g., approximately parallel to the Y-axis), as illustrated in FIG. 11, or relative to the X-axis (e.g., approximately parallel to the X-axis). In other words, the X, Y-values of data points 106 of point cloud 104 may be adjusted (e.g., increased or decreased) proportionally in the amount required to change the X-values of data points 106 of reference line 146 to a predetermined X-coordinate or in the amount required to change the Y-values of data points 106 of reference line 146 to a predetermined Y-coordinate. As one example, X-coordinate may be zero (e.g., X=0). As one example, Y-coordinate may be zero (e.g., Y=0).

Referring to FIG. 4, and with reference to FIGS. 1, 2, 12 and 13, in one example, the registering step (block 514) includes the step of selecting first X, Y-coordinate reference point 148a from first data points 106a and second X, Y-coordinate reference point 148b from second data points 106b, as shown at block 536. In one example, the registering step (block 514) includes the step of fixing first point cloud 104a relative to first X, Y-coordinate reference point 148a and second point cloud 104b relative to second X, Y-coordinate reference point 148b, as shown at block 538. In one example, the registering step (block 514) includes the step of aligning first X, Y-coordinate reference point 148a and second X, Y-coordinate reference point 148b with a common X-coordinate and Y-coordinate of reference coordinate system 128 to register first point cloud 104a and second point cloud 104b to the X-axis and the Y-axis, as shown at block 540.

Thus, the registering step (block 514) may orient point cloud 104 relative to a predetermined X-coordinate value and Y-coordinate value by translating point cloud 104 along at least one of the X-axis and the Y-axis. X, Y-coordinate reference point 148 may be generated by exploiting a portion or subset of data points 106 representing outer boundary 220 (e.g., data points 106 of outer boundary edge 112). As one example, X, Y-coordinate reference point 148 is one of the subset of data points 106 representing outer boundary edge 112.

Figure 12:
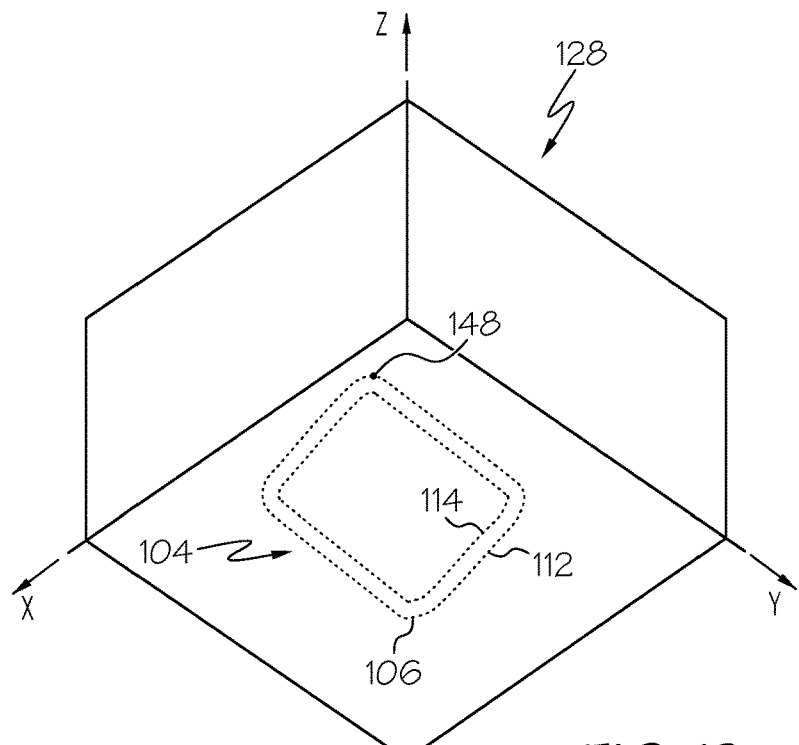
FIG. 12 is a schematic illustration of one example of a point cloud positioned within the reference coordinate system.
Figure 13:
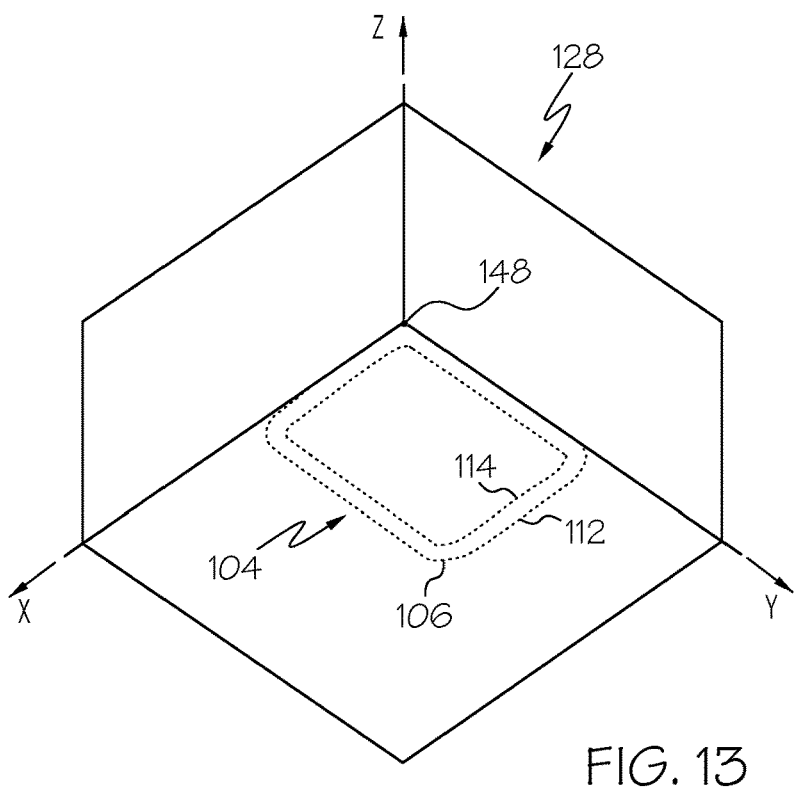
FIG. 13 is a schematic illustration of one example of the point cloud of FIG. 12 registered relative to an X-axis and a Y-axis of the reference coordinate system.

In one example, once X, Y-coordinate reference point 148 has been generated (e.g., extracted) (block 536), the alignment step (block 540) includes translating the entire point cloud 104 (e.g., a rigid body transformation) about at least one of the X-axis and the Y-axis to orient and position X, Y-coordinate reference point 148 at a common X-coordinate and Y-coordinate, as illustrated in FIGS. 12 and 13, and, thus, orienting point cloud 104 relative to the X-axis and the Y-axis, as illustrated in FIG. 13. In other words, the X, Y-values of data points 106 of point cloud 104 may be adjusted (e.g., increased or decreased) proportionally in the amount required to change the X-value of X, Y-coordinate reference point 148 to a predetermined X-coordinate or in the amount required to change the Y-value of X, Y-coordinate reference point 148 to a predetermined Y-coordinate. As one example, X-coordinate may be zero (e.g., X=0). As one example, Y-coordinate may be zero (e.g., Y=0).

As one example, X, Y-coordinate reference point 148 may be one of data points 106 having a minimum X-value and/or Y-values. Thus, translating point cloud 104 may remove an offset of minimum X-values and/or Y-values of data points 106 of point cloud 104 relative to reference coordinate system 128. In other words, the X-values and/or Y-values of data points 106 of point cloud 104 may be adjusted (e.g., increased or decreased) proportionally in the amount required to change the minimum X-value and/or the minimum Y-value (e.g., a data point having the smallest X-value and/or Y-value) to X=0 and Y=0.

Figure 8:
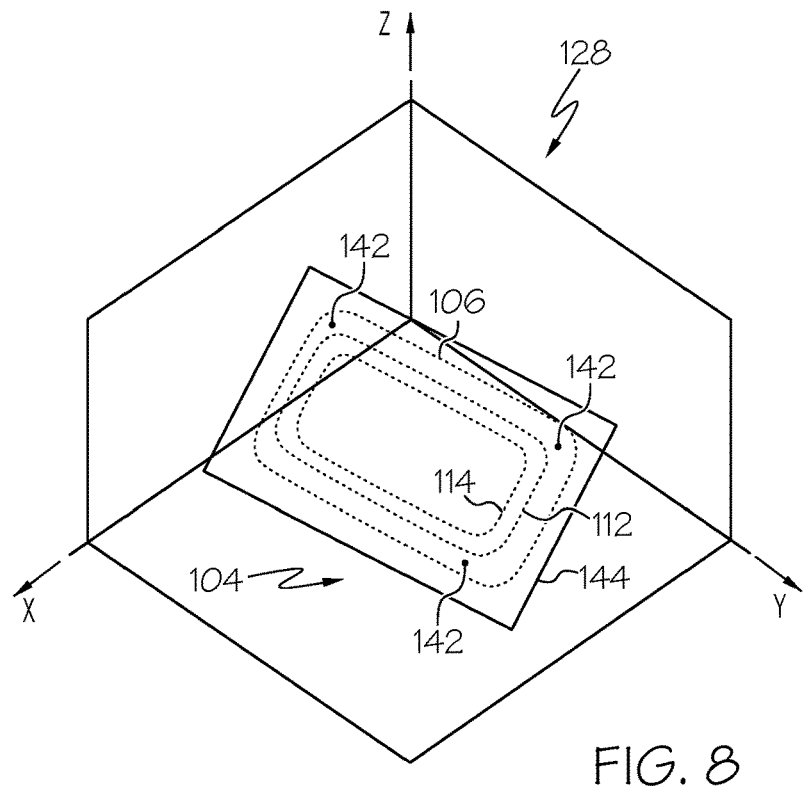
FIG. 8 is a schematic illustration of one example of a point cloud positioned within the reference coordinate system.

Referring to FIGS. 2 and 4, and with reference to FIGS. 8-13, in one example, after each subset and before the subsequent subset of the registering step (block 514), for example: the subset shown at blocks 524, 526, 528 (FIG. 4) and illustrated in FIGS. 8 and 9; the subset shown at blocks 530, 532, 534 (FIG. 4) and illustrated in FIGS. 10 and 11; and the subset shown at blocks 536, 538, 540 and illustrated in FIGS. 12 and 13, the step of extracting first outer boundary edge 112a and second outer boundary edge 112b may be repeated.

Referring to FIG. 2, and with reference to FIGS. 1 and 3, in one example, method 500 includes the step of extracting first outer boundary edge 112a and second outer boundary edge 112b, as shown at block 520. The step of extracting first outer boundary edge 112a of first point cloud 104a may identify first surface subset 138a of first data points 106a representative of surface 204 and first background surface subset 136a of first data points 106a representative of background surface 214. The step of extracting second outer boundary edge 112b of second point cloud 104b may identify second surface subset 138b of second data points 106b representative of surface 204 and second background surface subset 136b of second data points 106b representative of background surface 214. In other words, extracting first outer boundary edge 112a and second outer boundary edge 112b may identify outer boundary 220 defining surface 204.

In one example, the extracting step (block 520) identifies which ones of data points 106 represent background surface 214 and which other ones of data points 106 represent surface 204. Data points 106 of point cloud 104 having X, Y-values outside of the detected values of data points 106 representing outer boundary edge 112 are representative of background surface 214 (e.g., background surface subset 136). Data points of point cloud 104 having X, Y-values inside of the detected values of data points 106 representing outer boundary edge 112 are representative of surface 204 (e.g., surface subset 138). Since data points 106 are organized into a consistent data matrix (e.g., as point mesh 108) and outer boundary edge 112 is a three-dimensional shape (e.g., representing a change in vertical position), image-processing techniques and/or edge detection algorithms may be utilized to detect and extract outer boundary edge 112 from point cloud 104. As one specific, non-limiting example, a Sobel operator (also referred to as a Sobel filter) may be used to detect and extract outer boundary edge 112.

In one example, at various times throughout the point cloud processing operational steps, the portion or subset of data points 106 having values outside of outer boundary edge 112 and identified as representing background surface 214 (e.g., background surface subset 136) may be discarded, when not needed.

Referring to FIG. 2, and with reference to FIGS. 1 and 3, in one example, method 500 includes the step of registering first reference portion subset 130a of first data points 106a representative of reference portion 212 and second reference portion subset 130b of second data points 106b representative of reference portion 212 relative to each other, as shown at block 516.

In one example, the registering step (block 516) includes the step of matching or aligning first data points 106a of first point cloud 104a and second data points 106b of second point cloud 104b. Generally, in one example, the matching and aligning may include utilization of an iterative closest point algorithm to compute (e.g., find) a point cloud transformation that minimizes the difference between first point cloud 104a and second point cloud 104b.

Figure 5:
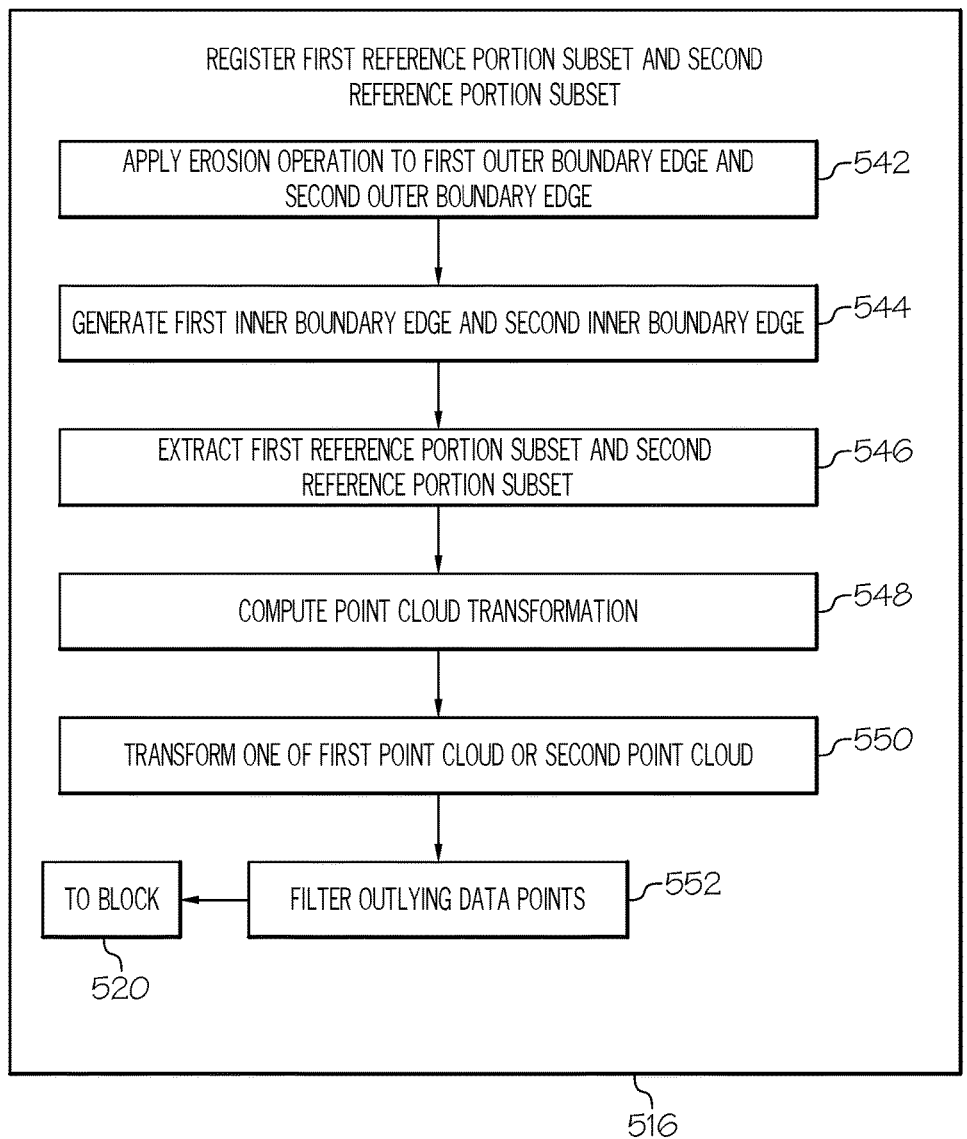
FIG. 5 is a flow diagram of one example of the second registering step of the method of FIG. 2.

Referring to FIG. 5, and with reference to FIGS. 1-3, in one example, the registering step (block 516) includes the step of generating first inner boundary edge 114a of first point cloud 104a and second inner boundary edge 114b of second point cloud 104b, as shown at block 542. In one example, the registering step (block 516) includes the step of applying an erosion operation to the first outer boundary edge 112a to generate first inner boundary edge 114a and to second outer boundary edge 112b to generate second inner boundary edge 114b, as shown at block 544.

In one example, first outer boundary edge 112a and second outer boundary edge 112b may be extracted prior to the step of generating first inner boundary edge 114a and second inner boundary edge 114b. The extracting steps may be (e.g., may be performed in substantially the same manner as) the extracting steps shown at block 520.

In one example, the erosion operation is a mathematical morphology operation applied to point cloud 104 (e.g., first point cloud 104a and/or second point cloud 104b). As one example, outer boundary edge 112 representative of outer boundary 220 of surface 204 is eroded (e.g., shrunk or reduced) by a predetermined value to generate inner boundary edge 114 approximating inner boundary 218. As one example, the predetermined value may be the linear dimension (e.g., a measured value) between outer boundary 220 and inner boundary 218. As one example, the predetermined value may be the linear dimension (e.g., a measured value) of the thickness of the masking used to protect reference portion 212 from being covered with surface coating 210.

In another example, a different mathematical morphology operation may be applied to point cloud 104. For example, a dilation operation may be applied to point cloud 104 (e.g., first point cloud 104*a* and/or second point cloud 104*b*). As one example, the extracting step (block 514) may extract first inner boundary edge 114*a* and second inner boundary edge 114*b*. In such an example, inner boundary 218 may be a three-dimensional shape applied to or otherwise formed on surface 204, which may be extracted by an edge detection algorithm. The registering step (block 516) may include the step of generating first outer boundary edge 112*a* of first point cloud 104*a* and second outer boundary edge 112*b* of second point cloud 104*b* (e.g., block 542). In one example, the registering step (block 516) may include the step of applying a dilation operation to first inner boundary edge 114*a* to generate first outer boundary edge 112*a* and to second inner boundary edge 114*b* to generate second outer boundary edge 112*b* (e.g., block 544).

As one example, inner boundary edge 114 representative of inner boundary 218 of surface 204 is dilated (e.g., grown or expanded) by a predetermined value to generate outer boundary edge 112 approximating outer boundary 220. As one example, the predetermined value may be the linear dimension (e.g., a measured value) between inner boundary 218 and outer boundary 220. As one example, the predetermined value may be the linear dimension (e.g., a measured value) of the thickness of the masking used to protect reference portion 212 from being covered with surface coating 210.

In one example, the portion or subset of data points 106 having values outside of outer boundary edge 142 and identified as representing background surface 214 (e.g., background surface subset 136) may be discarded. Thus, as one example, first point cloud 104*a* and second point cloud 104*b* may include data points 106 (e.g., measured points) having values inside of outer boundary edge 142 and representing surface 204 (e.g., surface subset 138).

In one example, the registering step (block 516) includes the step of extracting (e.g., identifying) first reference portion subset 130*a* as being between first outer boundary edge 112*a* (e.g., either extracted or generated) and first inner boundary edge 114*a* (e.g., either generated or extracted) and second reference portion subset 130*b* as being between second outer boundary edge 112*b* (e.g., either extracted or generated) and second inner boundary edge 114*b*, as shown at block 546.

A portion of first point cloud 104*a* defined (e.g., formed) by first data points 106*a* located between first outer boundary edge 112*a* and first inner boundary edge 114*a* (e.g., first reference portion subset 130*a* representative of reference portion 212) may be isolated. Likewise, a portion of second point cloud 104*b* defined (e.g., formed) by second data points 106*b* located between second outer boundary edge 112*b* and second inner boundary edge 114*b* (e.g., second reference portion subset 130*b* representative of reference portion 212) may be isolated.

In one example, the registering step (block 516) includes the step of computing point cloud transformation 150 to register first reference portion subset 130*a* and second reference portion subset 130*b* relative to each other, as shown at block 548.

Data points 106 representing the portion of surface 204 located within inner boundary edge 114 may represent different surfaces in first point cloud 104*a* and second cloud 104*b*, for example, bare portion 206 and coated portion 208, respectively. Initially, the computed point cloud transformation 150 may be performed on data points 106 (e.g., reference portion subset 130) representing the portion of surface 204 located between outer boundary edge 112 and inner boundary edge 114 (e.g., reference portion 212) that are the same in first point cloud 104*a* and second point cloud 104*b*.

As one example, point cloud transformation 150 may be at least one of a rigid body transformation (e.g., rigid registration), such as translating and/or rotating, and a non-rigid body transformation (e.g., non-rigid registration), such as scaling or other affine transformations, to match one of point clouds 104 (e.g., either first point cloud 104*a* or second point cloud 104*b*) to another one of point clouds 104 (e.g., either second point cloud 104*b* or first point cloud 104*a*). Generally, the rigid transformation is defined as a transformation that does not change the distance between any two points (e.g., a uniform or linear transformation). Generally, the non-rigid is defined as a transformation that does change the distance between any two points (e.g., a non-uniform or nonlinear transformation).

In one example, point cloud body transformation 150 may be performed on only a portion or subset of data points 106 representing surface 204 (e.g., surface subset 138). Therefore, data points 106 representing background surface 214 (e.g., background surface subset 136) may be removed from point cloud 104.

In one example, an iterative closest point ("ICP") algorithm is utilized to perform point cloud transformation 150 to best match a reference set of data points 106 (e.g., one of first reference portion subset 130*a* or second reference portion subset 130*b*) to a source set of data points 106 (e.g., other one of first reference portion subset 130*a* or second reference portion subset 130*b*) by assuming every data point 106 in the reference set of data points 106 corresponds to the closest point in the source set of data points. The ICP algorithm may iteratively revises point cloud transformation 150 needed to minimize the distance from the source set of data points 106 (e.g., source point cloud 104) to the reference set of data points 106 (e.g., reference point cloud 104).

In one example, first point cloud 104*a*, including first reference portion subset 130*a*, may be the reference point cloud 104 and second point cloud 104*b*, including second reference portion subset 130*b*, may be the source point cloud 104. In another example, first point cloud 104*a*, including first reference portion subset 130*a*, may be the source point cloud 104 and second point cloud 104*b*, including second reference portion subset 130*b*, may be the reference point cloud 104.

At this point in processing, point cloud transformation 150 is applied only to first reference portion subset 130*a* and second reference portion subset 130*b*. As one example, for each data point 106 in the source point cloud 104, the ICP operation (algorithm) may find the closest data point in the reference point cloud 104. The ICP operation may estimate the combination of rotation, translation, and/or scaling using a mean squared error cost function that will best align each source data points 106 (e.g., point in source point cloud 104) to its match found in reference data points 106 (e.g., point in reference point cloud 104). The ICP operation may transform the source data points 106 using the obtained point cloud transformation 150. This process may iterate as needed to re-associate data points 106.

In one example, the registering step (block 516) includes the step of transforming one of first point cloud 104a or second point cloud 104b by point cloud transformation 150 to register (e.g., match or align) first point cloud 104a and second point cloud 104b relative to each other, as shown at block 550.

Transforming (e.g., applying the computed point cloud transformation 150 to) the entire first point cloud 104a, including first reference portion subset 130a and bare portion subset 132, or the entire second point cloud 104b, including second reference portion subset 130b and coated portion subset 134, based on point cloud transformation 150 needed to match or align X, Y-values of first reference portion subset 130a and X, Y-values of second reference portion subset 130b, may match or align the X, Y-values of bare portion subset 132 and the X, Y-values of coated portion subset 134.

In one example, first point cloud 104a, including first reference portion subset 130a and bare portion subset 132, may be the reference point cloud 104 and second point cloud 104b, including second reference portion subset 130b and coated portion subset 134, may be the source point cloud 104. In another example, first point cloud 104a, including first reference portion subset 130a and bare portion subset 132, may be the source point cloud 104 and second point cloud 104b, including second reference portion subset 130b and coated portion subset 134, may be the reference point cloud 104.

Accordingly, the step of registering first point cloud 104a and second point cloud 104b relative to reference coordinate system 128 may roughly match or align the X, Y-values of first data points 106a and the X, Y-values of second data points 106b. The step of registering first point cloud 104a and second point cloud 104b relative to each other may finely match or align the X, Y-values of first data points 106a and the X, Y-values of second data points 106b.

In one example, the registering step (block 516) includes the step of filtering outlying ones of data points 106 (referred to herein as outlying data points 106), as shown at block 552.

As one example, ones of first data points 106a and ones of second points 106b having values outside of a preselected standard deviation may be removed (e.g., discarded). Data points 106 outside of the preselected standard deviation may be representative of data points 106 located outside of outer boundary edge 112 (e.g., background surface subset 136 data points 106). As one example, the preselected standard deviation may be 3.5 from zero.

As illustrated in FIGS. 2 and 5, the registering step (block 516) may be iterative in order to more closely align first reference portion subset 130a and second reference portion subset 130b, thereby more closely aligning bare portion subset 132 and coated portion subset 134.

Referring to FIG. 2, and with reference to FIGS. 1 and 3, in one example, method 500 includes the step of calculating difference values 140 indicative of thickness 228 of surface coating 210 based on differences between coated portion subset 134 of second data points 106b of second point cloud 104b and bare portion subset 132 of first data points 106a of first point cloud 104a, as shown at block 518.

In one example, upon matching or aligning bare portion subset 132 and coated portion subset 134, following the registering step (block 516), X, Y-values of bare portion subset 132 of first data points 106a may be matched to X, Y-values of coated portion subset 134 of second data points 106b. First point cloud 104a and second point cloud 104b may be organized (e.g., converted to first point mesh 108a and second point mesh 108b, respectively). Once X, Y-values of bare portion subset 132 and coated portion subset 134 are matched and organized into a matrix relative to reference coordinate system 128, the difference between the Z-value of each data point 106 of coated portion subset 134 and the Z-value of each data point 106 of bare portion subset 132 (difference values 140) may be indicative of (calculated to obtain) thickness 228 of surface coating 210 at any point on coated portion 208 of surface 204.

In one example, method 500 may include the step of filtering difference values 140, as shown at block 554. As one example, the filtering step (block 554) may include the step of applying a Gaussian filter to difference values 140. As one example, a mean filter may be applied to groups of difference values 140 located within a set volume in order to average the ones of difference values 140 within the set volume and, thus, calculate a new difference value 140 corresponding to a larger area on coated portion 208 of surface 204.

Referring to FIG. 1, generally, object 200 may be any structure, component, part, element, article, etc. that may be subjected to a manufacturing, remanufacturing, repair, and/or refurbishment process, for example, the coating process. Object 200 may have any size and/or shape. Object 200 may be made of any desired material. As non-limiting examples, object 200 may be a composite (e.g., a fiber-reinforced polymer), a metal, a metal alloy, a plastic, or a combination thereof.

While the apparatus and method described herein may be utilized with an object made of any material, one advantage of and/or benefit provided by the disclosed apparatus and method is the ability to determine (e.g., measure and/or calculate) the thickness of a surface coating applied to non-metallic materials. Current devices and methods for determining the thickness of a surface coating may not be suitable for use with non-metallic materials and/or may not provide sufficiently accurate results.

Figure 14:
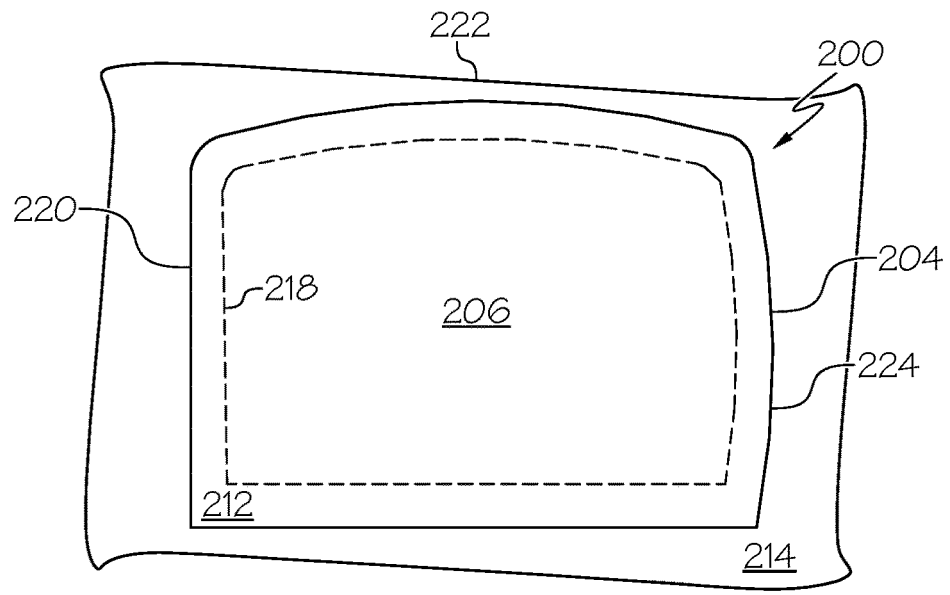
FIG. 14 is a schematic illustration of one example of an object prior to a coating process.
Figure 15:
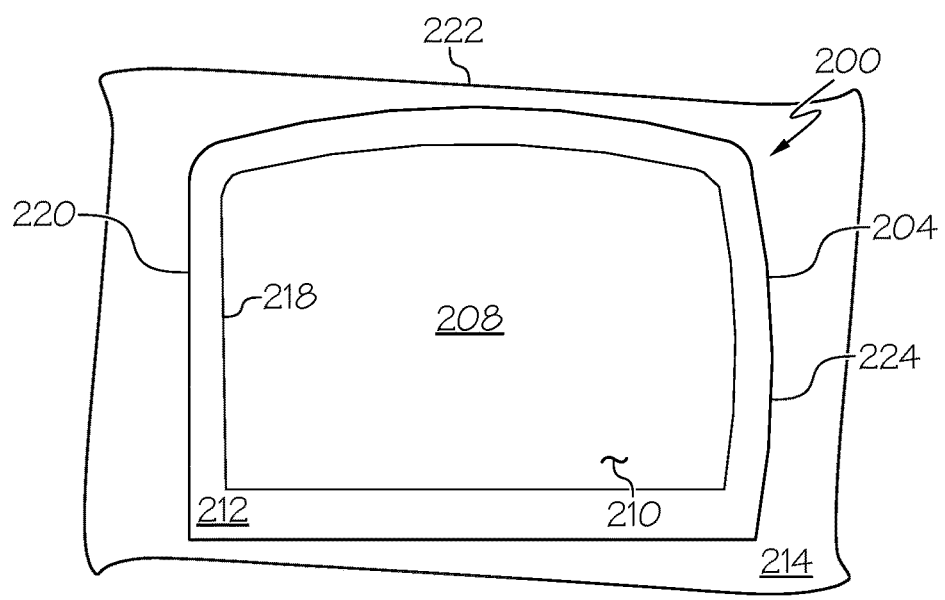
FIG. 15 is a schematic illustration of one example of the object of FIG. 14 following the coating process.

Referring to FIGS. 14 and 15, and with reference to FIGS. 1 and 2, in one example, object 200 may be coupon 224 (e.g., a test coupon). Coupon 224 may be a test sample of a material upon which the coating process will be performed. As one example, the disclosed apparatus 100 and method 500 may be used with a plurality of coupons 224 to develop and/or characterize the coating process (e.g., application of surface coating 210). As one example, apparatus 100 and method 500 may be utilized to determine (e.g., measure and/or calculate) the thickness of surface coating 210 applied to coupon 224 based on different coating parameters. FIG. 14 illustrates a top plan view of area of interest 222 prior to undergoing the coating process, for example, surface 204 of coupon 224 including bare portion 206 and reference portion 212 and a portion of background surface 214. FIG. 15 illustrates the same top plan view of area of interest 222 following the coating process, for example, surface 204 of coupon 224 including coated portion 208 and reference portion 212 and the portion of background surface 214.

In one example, when capturing data points 106, as point cloud 104, representing surface 204 of coupon 224, point cloud 104 also includes data points 106 representing background surface 214. As one example, background surface 214 is a support surface on which coupon 224 rests. For example, coupon 224 may be supported on background surface 214 when metrology instrument 102 (FIG. 1) generates point cloud 104.

In one example, coupon 224 includes a physical perimeter edge (e.g., shape). Surface 204 may include a perimeter edge (e.g., shape) defined by the physical perimeter edge of coupon 224. In other words, the perimeter edge of coupon 224 may define (form) outer boundary 220 of surface 204 and the outer border of reference portion 212, both prior to and following the coating process. Thus, in one example, outer boundary 220 is a three-dimensional shape defined (formed) by the perimeter edge of coupon 224. Outer boundary 220 may be defined by the intersection of surface 204 of coupon 224 and background surface 214 upon which coupon 224 rests, each having a different vertical position (e.g., coordinate values along a Z-axis). In another example, outer boundary 220 is a three-dimensional shape defined by an outer perimeter edge of masking (not explicitly illustrated) utilized to protect reference portion 212 from the coating process.

In one example, inner boundary 218 of surface 204 defines the inner border of reference portion 212, the outer border of bare portion 206 (FIG. 3), and the outer border of coated portion 208 (FIG. 4). As one example, prior to the coating process, reference portion 212 is a portion of surface 204 defined between inner boundary 218 and outer boundary 220 (e.g., an outer perimeter portion of bare portion 206), and following the coating process, reference portion 212 is a portion of surface 204 defined between inner boundary 218 and outer boundary 220 that remains uncoated.

First data points 106a of surface 204 of coupon 224 may be acquired, as first point cloud 104a, representing points on at least one of bare portion 206, reference portion 212, and background surface 214 located within area of interest 222. Coupon 224 is then subjected to the coating process (e.g., surface coating 210 is applied to bare portion 206) to form coated portion 208. Reference portion 212 remains unmodified during the coating process (e.g., remains uncoated). As one example, the masking (not explicitly illustrated), for example, masking tape, a stencil, etc., may be used to cover and protect from change a portion of surface 204 during the coating process in order to define (form) at least a portion of reference portion 212. In one example, the masking may define at least a portion of or the entirety of inner boundary 218 (e.g., inner boundary edge 114). In one example, the masking may define at least a portion of or the entirety of outer boundary 220 (e.g., outer boundary edge 112), for example, the masking may be applied up to the perimeter edge of coupon 224.

Second data points 106b of surface 204 of coupon 224 may then be acquired, as second point cloud 104b, representing points on at least one of coated portion 208, reference portion 212, and background surface 214. When the masking is used to form reference portion 212, the masking is removed prior to acquiring second point cloud 104b. Thus, a portion of first point cloud 104a (e.g., first reference portion subset 130a representing reference portion 212) and a portion of second point cloud 104b (e.g., second reference portion subset 130b representing reference portion 212) may represent the same portion of surface 204 (e.g., reference portion 212) having the same three-dimensional features and/or two-dimensional features.

Coupon 224 may have any perimeter shape and, as such, outer boundary 220 may have any shape. As one example, one or more portions (e.g., section) of outer boundary 220 may be straight. As another example, one or more portions of outer boundary 220 may be curved (e.g., including a border radius). As one example, an intersection of two adjoining portions of outer boundary 220 (e.g., a corner) may form a right angle. As another example, the intersection of two adjoining portions of outer boundary 220 may be chamfered. As yet another example, the intersection of two adjoining portions of outer boundary 220 may be rounded (e.g., including a corner radius).

Similarly, inner boundary 218 (e.g., formed by the masking) may have any perimeter shape. As one example, one or more portions of inner boundary 218 may be straight. As another example, one or more portions (e.g., sections) of inner boundary 218 may be curved (e.g., including a border radius). As one example, an intersection of two adjoining portions of inner boundary 218 (e.g., a corner) may form a right angle. As another example, the intersection of two adjoining portions of inner boundary 218 may be chamfered. As yet another example, the intersection of two adjoining portions of inner boundary 218 may be rounded (e.g., including a corner radius).

In one example, adjacent and spaced apart portions of outer boundary 220 and inner boundary 218 may have approximately the same shape (e.g., straight or curved), as illustrated in FIGS. 14 and 15. In another example, adjacent and spaced apart portions of outer boundary 220 and inner boundary 218 may have a different shape (e.g., a portion of outer boundary 220 may be straight while an adjacent and spaced apart portion of inner boundary 218 may be curved).

In one example, adjacent and spaced apart corners of inner boundary 218 and outer boundary 220 may have approximately the same shape, as illustrated in FIGS. 14 and 15. In another example, adjacent and spaced apart corners of inner boundary 218 and outer boundary 220 may have approximately different shapes.

Figure 16:
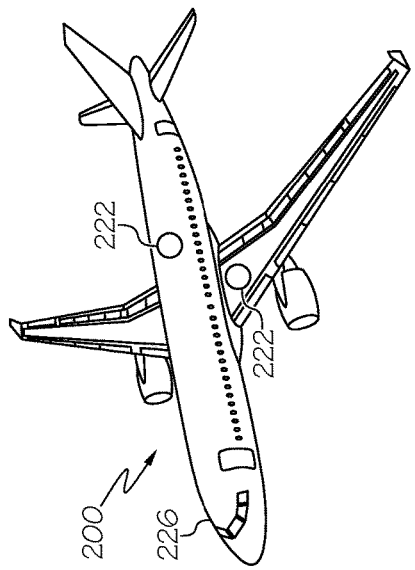
FIG. 16 is a schematic illustration of one example of the object.
Figure 18:
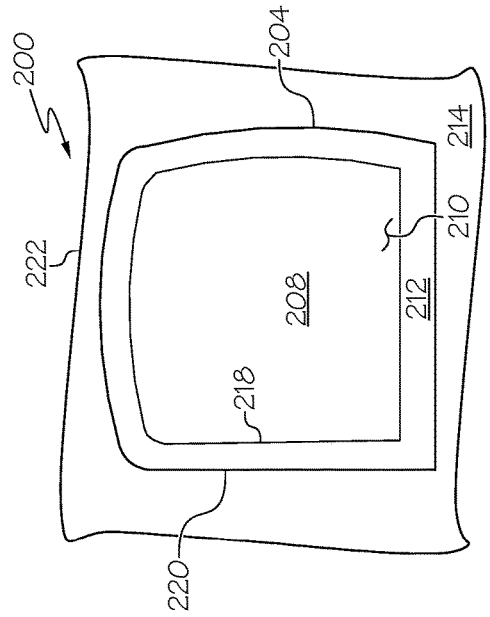
FIG. 18 is a schematic illustration of one example of the portion of the object of FIG. 16 following the coating process.
Figure 17:
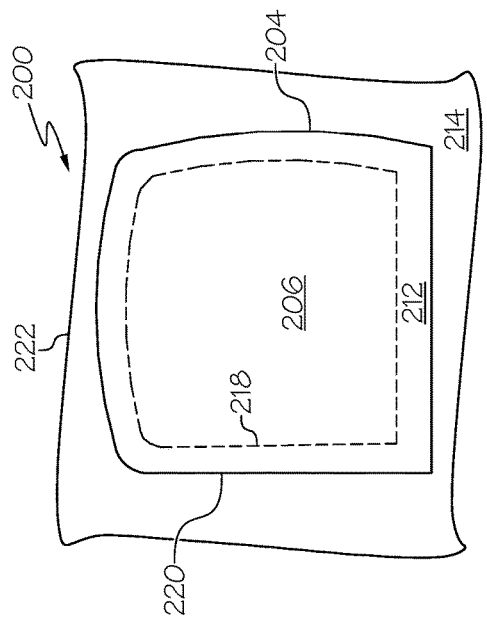
FIG. 17 is a schematic illustration of one example of a portion of the object of FIG. 16 prior to the coating process.

Referring to FIGS. 16-18, and with reference to FIGS. 1 and 2, in one example, object 200 may be a mobile platform 226, such as an aircraft (FIG. 16). While one non-limiting example of mobile platform 226 is described and illustrated herein with respect to a fixed-wing aircraft, in other examples, mobile platform 226 may also include land vehicles, marine vehicles, space vehicles, other types of air vehicles (both manned and unmanned), satellites, missiles, rockets, and the like. As one example, the disclosed apparatus 100 and method 500 may be used during manufacture or repair of mobile platform 226 to monitor the coating process (e.g., application of surface coating 210). As one example, apparatus 100 and method 500 may be utilized to determine (e.g., measure and/or calculate) thickness 228 of surface coating 210 applied to at least a portion of surface 204 of mobile platform 226 during the coating process. Any portion or component of mobile platform 226 (e.g., a fuselage, a wing, a tail section, etc.) may be subjected to the coating process and monitored by the disclosed apparatus 100. FIG. 17 illustrates an orthogonal view of area of interest 222 prior to undergoing the coating process, for example, surface 204 of mobile platform 226 including bare portion 206 and reference portion 212 and a portion of background surface 214. FIG. 18 illustrates an orthogonal view of area of interest 222 following the coating process, for example, surface 204 of mobile platform 226 including coated portion 208 and reference portion 212 and the portion of background surface 214.

In one example, when capturing data points 106, as point cloud 104, representing surface 204 of mobile platform 226, point cloud 104 may also include data points 106 representing background surface 214. As one example, background surface 214 may be another portion of the exterior surface of mobile platform 226 adjacent to, proximate to (e.g., at or near), and/or surrounding surface 204, for example, when metrology instrument 102 (FIG. 1) generates point cloud 104.

Surface 204 may include a perimeter edge defined by outer boundary 220. For example, outer boundary 220 of surface 204 may define the outer border of reference portion 212. Inner boundary 218 of surface 204 may define the inner border of reference portion 212, the outer border of bare portion 206 (FIG. 17), and the outer border of coated portion 208 (FIG. 18). In one example, prior to the coating process, reference portion 212 is a portion of surface 204 defined between inner boundary 218 and outer boundary 220 (e.g., an outer perimeter portion of bare portion 206), and following the coating process, reference portion 212 is a portion of surface 204 defined between inner boundary 218 and outer boundary 220 that remains uncoated.

Since in some examples, bare portion 206, reference portion 212, and/or background surface 214 may be the same exterior surface of mobile platform 226 (e.g., object 200), outer boundary edge 142 may be defined by (formed from) an artificial or other physical border applied to or otherwise formed on the exterior surface of mobile platform 226 around (e.g., surrounding) surface 204. Thus, in one example, outer boundary 220 may be a three-dimensional shape, for example, defining the intersection between surface 204 and background surface 214.

First data points 106a of surface 204 of mobile platform 226 may be acquired, as first point cloud 104a, representing points on at least one of bare portion 206, reference portion 212, and background surface 214 located within area of interest 222. Mobile platform 226 may be then subjected to the coating process (e.g., surface coating 210 is applied to bare portion 206) to form coated portion 208. Reference portion 212 remains unmodified during the coating process (e.g., remains uncoated with surface coating 210). The masking (not explicitly illustrated), for example, masking tape, a stencil, etc., may be used to cover and protect from change a portion of surface 204 during the coating process in order to define (form) at least a portion of reference portion 212. In one example, the masking may define at least a portion of or the entirety of inner boundary 218. In one example, the masking may define at least a portion of or the entirety of outer boundary 220 (e.g., the masking may be applied up to the physical border applied to the exterior surface of mobile platform 226 around surface 204).

Second data points 106b of surface 204 may then be acquired, as second point cloud 104b, representing points on at least one of coated portion 208, reference portion 212, and background surface 214. When the masking is used to form reference portion 212, the masking is removed prior to acquiring second point cloud 104b. Thus, a portion of first point cloud 104a (e.g., first reference portion subset 130 representing reference portion 212) and a portion of second point cloud 104b (e.g., second reference portion subset 130b representing reference portion 212) represent the same portion of surface 204 (e.g., reference portion 212) having the same three-dimensional features and/or two-dimensional features.

Referring to FIGS. 17 and 18, surface 204 of mobile platform 226 may have any perimeter shape and, as such, outer boundary 220 may have any shape. As one example, one or more portions (e.g., section) of outer boundary 220 may be straight. As another example, one or more portions of outer boundary 220 may be curved (e.g., including a border radius). As one example, an intersection of two adjoining portions of outer boundary 220 (e.g., a corner) may form a right angle. As another example, the intersection of two adjoining portions of outer boundary 220 may be chamfered. As yet another example, the intersection of two adjoining portions of outer boundary 220 may be rounded (e.g., including a corner radius).

Similarly, inner boundary 218 (e.g., formed by the masking) may have any perimeter shape. As one example, one or more portions of inner boundary 218 may be straight. As another example, one or more portions (e.g., sections) of inner boundary 218 may be curved (e.g., including a border radius). As one example, an intersection of two adjoining portions of inner boundary 218 (e.g., a corner) may form a right angle. As another example, the intersection of two adjoining portions of inner boundary 218 may be chamfered. As yet another example, the intersection of two adjoining portions of inner boundary 218 may be rounded (e.g., including a corner radius).

In one example, adjacent and spaced apart portions of outer boundary 220 and inner boundary 218 may have approximately the same shape (e.g., straight or curved), as illustrated in FIGS. 17 and 18. In another example, adjacent and spaced apart portions of outer boundary 220 and inner boundary 218 may have a different shape (e.g., a portion of outer boundary 220 may be straight while an adjacent and spaced apart portion of inner boundary 218 may be curved).

In one example, adjacent and spaced apart corners of inner boundary 218 and outer boundary 220 may have approximately the same shape, as illustrated in FIGS. 17 and 18. In another example, adjacent and spaced apart corners of inner boundary 218 and outer boundary 220 may have approximately different shapes.

Referring to FIG. 2, and with reference to FIGS. 1 and 3, in one example, method 500 may also include the step of removing non-surface features 230 represented by data points 106 in point cloud 104, as shown at block 556.

In one example, surface 204 may include one or more non-surface features 230. As one example, such non-surface features 230 may include target markers (e.g., stickers, appliqué, etc.) applied to surface 204, which may be used by image scanner 116 to improve the accuracy of point cloud generation from a series of measured data points. Thus, ones of data points 106 in point cloud 104 representative of non-surface features 230 are undesirable and not useful in point cloud registration. Therefore, data points 106 representing non-surface features 230 may be removed from point cloud 104. As one example, data points 106 representing non-surface features 230 may be removed following a first iteration of, registering point cloud 104 relative to another point cloud 104 (block 516). After data points 106 representing non-surface features 230 have been removed from point clouds 104, subsequent iterations of registering point cloud 104 relative to another point cloud 104 may not include the removing step (block 556).

As one example, non-surface features 230 (e.g., image scanner target markers) may be applied to reference portion 212 of surface 204. Thus, some of data points 106 of reference portion subset 130 of point cloud 104 (e.g., in both first reference portion subset 130a of first point cloud 104a and second reference portion subset 130b of second point cloud 104b) mat be representative of non-surface features 230.

In one example, the step of removing non-surface features 230 (block 556) may be performed following a first iteration of the steps of extracting outer boundary edge 112 (block 520), generating inner boundary edge 114 (block 544), and registering reference portion subsets 130 of point clouds 104 (block 516). Thus, reference portion subset 130 of data points 106 of each one of point clouds 104 is identified by outer boundary edge 112 and inner boundary edge 114 (e.g., the reference edges or borders of reference portion 212 of surface 204).

In one example, the step of removing non-surface features 230 (block 556) includes the step of extracting a gradient direction from reference portion subsets 130 of the registered (e.g., matched or aligned) point clouds 104. As one example, a first central difference gradient operation may be performed on (applied to) reference portion subsets 130 of point clouds 106 (e.g., between first reference portion subset 130a of first point cloud 104a and second reference portion subset 130b of second point cloud 104b) to extract the gradient direction between data points 106 of reference portion subsets 130.

In one example, the step of removing non-surface features 230 (block 556) includes the step of extracting a gradient magnitude from reference portion subsets 130 of the registered point clouds 104. As one example, a second central difference gradient operation may be performed on (applied to) reference portion subsets 130 of point clouds 106 (e.g., between first reference portion subset 130a of first point cloud 104a and second reference portion subset 130b of second point cloud 104b) resulting from the first central difference gradient operation to extract the gradient magnitude.

In other words, the first and second central difference gradient operations may filter ones of data points 106 of reference portion subsets 130 based on the noise, or lack thereof, between data points 106 of reference portion subsets 130 of registered point clouds 104. As one example, there may be very little noise or different between ones of data points 106 of first reference portion subset 130a of first point cloud 104a and second reference portion subset 130b representing non-surface feature 230. The extracted gradient direction and magnitude may identify those one of data points 106 having little to no noise between first reference portion subset 130a and second reference portion subset 130b, thereby, being representative of non-surface feature 230.

In one example, the step of removing non-surface features 230 (block 556) includes the step of extracting a binary image from reference portion subsets 130 of the registered point clouds 104. As one example, the gradient magnitude of reference portion subsets 130 of point clouds 104 resulting from the second central difference gradient operation may be filtered to extract the binary image representing the registered point clouds 104. As one example, a value of the gradient magnitude of ones of data points 106 in reference portion subsets 130 may be compared to a threshold value indicative of reference portion 212 or non-surface feature 230. Data points 106 that fall below the threshold value may represent data points 106 of reference portion subset 130 representative of non-surface feature 230.

In one example, the step of removing non-surface features 230 (block 556) includes the step of filtering non-surface features 230 represented in the binary image. As one example, non-surface features 230 may be filtered based on size. As one example, a morphological close operation may be performed on (applied to) the binary image to filter non-surface features 230.

In one example, the step of removing non-surface features 230 (block 556) includes the step of selecting a centroid of the representation of non-surface features 230 represented in the binary image and enclosing the centroid. As one example, enclosing the centroid may include placing a circle around the centroid. The circle may include approximately the same dimensions or size (e.g., diameter) as the physical non-surface feature 230 (e.g., sticker) applied to surface 204.

In one example, the step of removing non-surface features 230 (block 556) includes the step of removing ones of data points 106 from reference portion subset 130 of point cloud 104 that fall within the enclosed area around the centroid (e.g., within the circle).

Figure 19:
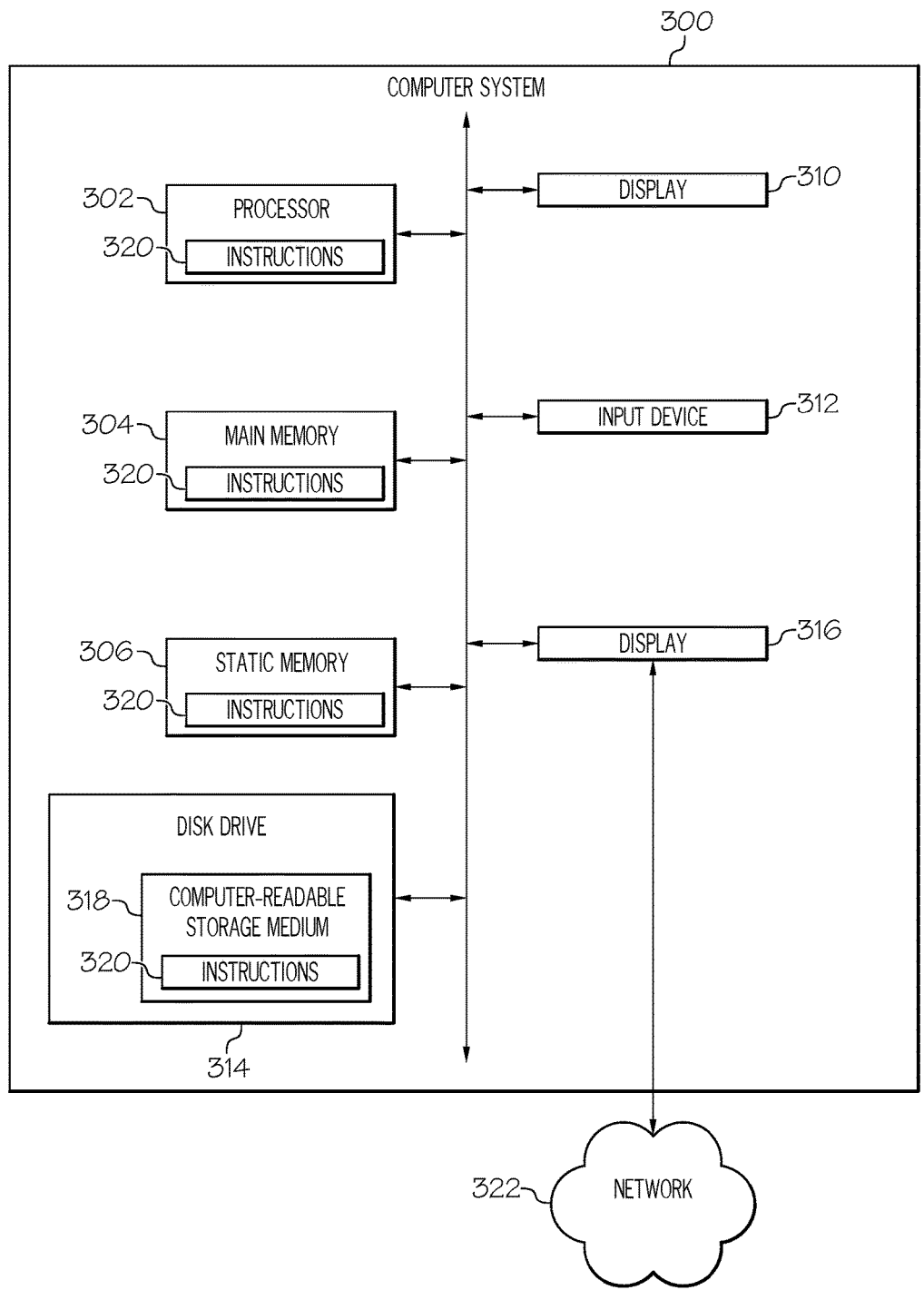
FIG. 19 is a schematic block diagram of one example of a computer system.

Referring to FIG. 19, and with reference to FIG. 1, one example of computer 300 is disclosed. As one example, computer 300 may provide an operative environment for the disclosed method 500. For example, method 500 may be implemented in one computer 300 or in several interconnected computers 300. The computer 300 may include any collection of computing devices or computer systems that individually or jointly execute a set (or multiple sets) of instructions to implement any one or more of the operations discussed herein. Any type of computer 300 or other apparatus adapted for carrying out the methods described herein may be utilized. A typical combination of hardware and software may be a general-purpose computer system. The general-purpose computer system may include a computer program that can control the computer 300 such that it carries out the methods described herein.

As an example, implementation of method 500 may take the form of a computer program product on a computer-usable storage medium (e.g., a hard disk, a CD-ROM, solid state memory, or the like). The computer-usable storage medium may include computer-usable program code embodied thereon. As used herein, the term computer program product may refer to a device including features enabling the implementation of the methods described herein. The terms computer program, software application, computer software routine, and/or other variants of these terms may mean any expression, in any language, code, or notation, of a set of instructions intended to cause a computing system having information processing capability to perform a particular function either directly or after either or both of the following: a) conversion to another language, code, or notation; or b) reproduction in a different material form.

Computer 300 may include various types of computing systems and/or devices, including a server computer, a client user computer, a personal computer ("PC"), a tablet PC, a laptop computer, a desktop computer, a control system, a network router, switch or bridge, or any other device capable of executing a set of instructions (sequential or otherwise) that specifies actions to be taken by that device. Computer 300 may also include any electronic device that provides voice, video, and/or data communication.

Computer 300 may include processor 302 (e.g., a central processing unit ("CPU"), a graphics processing unit ("GPU"), or both), main memory 304 and static memory 306, which communicate with each other via bus 308. Computer 300 may include display 310 (e.g., a video display) and input device 312 (e.g., a keyboard, a mouse, etc.), disk drive 314, and/or network interface 316 (e.g., connected to network 322).

Disk drive 314 may include a computer-readable storage medium (e.g., a non-transitory computer-readable medium) 318 on which is stored one or more sets of instructions 320 (e.g., software code) configured to implement one or more of the operation, procedures, or functions described herein. Instructions 320 may reside, completely or partially, within main memory 304, static memory 306, and/or processor 302 during execution thereof by computer 300. Main memory 304 and processor 302 may constitute machine-readable media.

While computer-readable storage medium 318 is shown in an exemplary embodiment to be a single storage medium, the computer-readable storage medium may include a single medium or multiple media (e.g., a centralized or distributed database, and/or associated caches and servers) that store the one or more sets of instructions. The computer-readable storage medium may also include any medium that is capable of storing, encoding, or carrying a set of instructions for execution by the machine and that cause the machine to implement any one or more of the methodologies of the present disclosure.

For example, the computer-readable medium may include, but not be limited to, solid-state memories such as a memory card or other package that houses one or more read-only (e.g., non-volatile) memories, random access memories, or other re-writable (e.g., volatile) memories; magneto-optical or optical medium such as a disk or tape; carrier wave signals such as a signal embodying computer instructions in a transmission medium; and/or a digital file attachment or other self-contained information archive or set of archives considered to be a distribution medium equivalent to a tangible storage medium.

Instructions 320 may be referred to as program code, computer usable program code, or computer readable program code that may be read and executed by a processor 302. The program code, in the different embodiments, may be embodied on different physical or computer readable storage media, such as main memory 30304 or static memory 306.

The program code may be located in a functional form on the computer readable media that is selectively removable and may be loaded onto or transferred to computer 300 for execution by processor processor 302. The program code and computer readable media may form a computer program product. In one example, the computer readable media may be computer readable storage media or computer readable signal media.

Further, dedicated hardware implementations including, but not limited to, application-specific integrated circuits, programmable logic arrays, and other hardware devices may also be constructed to implement the methods described herein.

Those skilled in the art will recognize that computer 300 illustrated in FIG. 19 is but one example, and any other suitable computer system may be used without limitation.

Figure 20:
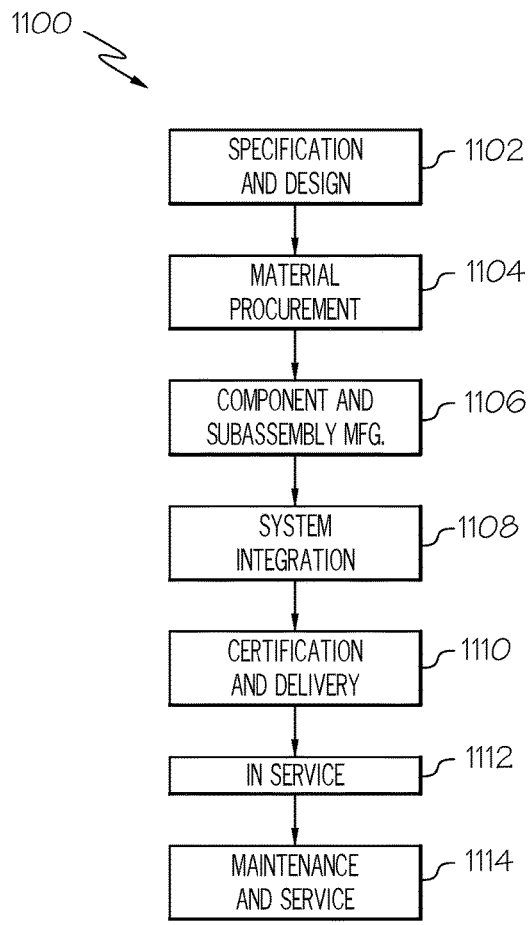
FIG. 20 is a block diagram of aircraft production and service methodology.
Figure 21:
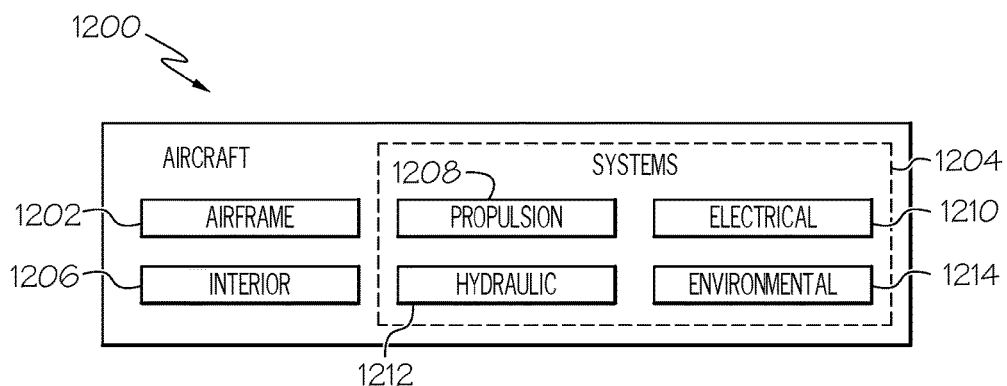
FIG. 21 is a schematic illustration of an aircraft.

Examples of apparatus and method disclosed herein may be described in the context of aircraft manufacturing and service method 1100 as shown in FIG. 20 and aircraft 1200 as shown in FIG. 21.

During pre-production, the illustrative method 1100 may include specification and design, as shown at block 1102, of aircraft 1200, and material procurement, as shown at block 1104. During production, component and subassembly manufacturing, as shown at block 1106, and system integration, as shown at block 1108, of aircraft 1200 may take place. Thereafter, aircraft 1200 may go through certification and delivery, as shown block 1110, to be placed in service, as shown at block 1112. While in service, aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 17, aircraft 1200 produced by illustrative method 1100 may include airframe 1202 and a plurality of high-level systems 1204 and interior 1206. Examples of high-level systems 1204 include one or more of propulsion system 1208, electrical system 1210, hydraulic system 1212 and environmental system 1214. Any number of other systems may be included. Although an aerospace example is shown, the principles disclosed herein may be applied to other industries, such as the automotive industry, the marine industry, and the like.

The apparatus and method shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus and method, or combination thereof, may be utilized during production stages (blocks 1108 and 1110). Similarly, one or more examples of the systems, apparatus, and methods, or a combination thereof, may be utilized, for example and without limitation, while aircraft 1200 is in service (block 1112) and during maintenance and service stage (block 1114).

Although various examples of the disclosed apparatus and method have been shown and described, modifications may occur to those skilled in the art upon reading the specification. The present application includes such modifications and is limited only by the scope of the claims.

What is claimed is:

1. A computer implemented method comprising:
providing a first point cloud representative of at least a bare portion of a surface of an object relative to a reference portion of said surface, said first point cloud comprising first data points characterizing spatial attributes of at least said bare portion and said reference portion;
extracting a first outer boundary edge of said first point cloud representative of an outer boundary of said surface;
extracting a first inner boundary edge of said first point cloud representative of an inner boundary of said surface;
extracting a first reference portion subset of said first data points located between said first outer boundary edge and said first inner boundary edge and representative of said reference portion;
extracting a bare portion subset of said first data points located within said first inner boundary edge and representative of said bare portion;
providing a second point cloud representative of at least a coated portion of said surface relative to said reference portion, said coated portion comprising said bare portion covered with a surface coating, and said second point cloud comprising second data points characterizing spatial attributes of at least said coated portion and said reference portion;
extracting a second outer boundary edge of said second point cloud representative of said outer boundary of said surface;
extracting a second inner boundary edge of said second point cloud representative of said inner boundary of said surface;
extracting a second reference portion subset of said second data points located between said second outer boundary edge and said second inner boundary edge and representative of said reference portion;

extracting a coated portion subset of said second data points located within said second inner boundary edge and representative of said coated portion;

registering said first point cloud and said second point cloud with respect to a common reference coordinate system;

registering said first reference portion subset of said first data points and said second reference portion subset of said second data points with respect to one another; and calculating difference values indicative of a thickness of said surface coating based on differences between said coated portion subset of said second data points and said bare portion subset of said first data points.

2. The method of claim 1 further comprising:

positioning a metrology instrument relative to said object comprising said surface;

establishing said reference portion to define said outer boundary of said surface and said inner boundary of said surface;

acquiring said first point cloud based on a first measurement image taken of said bare portion and said reference portion;

applying said surface coating to said bare portion to create said coated portion; and acquiring said second point cloud based on a second measurement image taken of said coated portion and said reference portion.

3. The method of claim 2 wherein establishing said reference portion comprises masking a portion of said surface.

4. The method of claim 1 further comprising:

extracting a first background surface subset of said first data points located outside of said first outer boundary edge and representative of a background surface; and extracting a second background surface subset of said second data points located outside of said second outer boundary edge and representative of said background surface.

5. The method of claim 4 wherein:

extracting said first inner boundary edge of said first point cloud comprises applying an erosion operation to said first outer boundary edge;

extracting said second inner boundary edge of said second point cloud comprises applying said erosion operation to said second outer boundary edge;

registering said first reference portion subset and said second reference portion subset relative to each other comprises computing a point cloud transformation; and said method further comprises transforming one of said first point cloud or said second point cloud by said point cloud transformation to register said bare portion subset and said coated portion subset relative to each other.

6. The method of claim 5 wherein said point cloud transformation comprises at least one of a rigid body transformation and a non-rigid body transformation.

7. The method of claim 4 further comprising:

selecting three first reference data points from at least one of said first reference portion subset and said first background surface subset;

selecting three second reference data points from at least one of said second reference portion subset and said second background surface subset;

fixing said first data points of said first point cloud relative to said first reference data points;

fixing said second data points of said second point cloud relative to said second reference data points; and aligning said first reference data points and said second reference data points with a common Z-coordinate of said reference coordinate system to register said first point cloud and said second point cloud relative to a Z-axis.

8. The method of claim 4 further comprising:

generating a first reference line corresponding to a first portion of said first outer boundary edge;

generating a second reference line corresponding to a second portion of said second outer boundary edge;

fixing said first data points of said first point cloud relative to said first reference line;

fixing said second data points of said second point cloud relative to said second reference line; and aligning said first reference line and said second reference line with one of a common X-coordinate or Y-coordinate of said reference coordinate system to register said first point cloud and said second point cloud to one of an X-axis or a Y-axis.

9. The method of claim 4 further comprising:

selecting a first X,Y-coordinate reference point from said first data points;

selecting a second X,Y-coordinate reference point from said second data points;

fixing said first data points of said first point cloud relative to said first X,Y-coordinate reference point;

fixing said second data points of said second point cloud relative to said second X,Y-coordinate reference point; and aligning said first X,Y-coordinate reference point and said second X,Y-coordinate reference point with a common X-coordinate and Y-coordinate of said reference coordinate system to register said first point cloud and said second point cloud to an X-axis and a Y-axis.

10. The method of claim 1 wherein said thickness of said surface coating is between approximately 20 micrometers and approximately 100 micrometers.

11. The method of claim 1 wherein said surface coating comprises paint.

12. The method of claim 1 wherein said object comprises a non-metallic material.

13. An apparatus comprising:

a metrology instrument configured to acquire a point cloud representative of a portion of a surface of an object based on a measurement image taken of said portion of said surface, and to:

provide a first point cloud representative of at least a bare portion of said surface relative to a reference portion of said surface, said first point cloud comprising first data points characterizing spatial attributes of at least said bare portion and said reference portion; and provide a second point cloud representative of at least a coated portion of said surface relative to said reference portion, said coated portion comprising said bare portion covered with a surface coating, and said second point cloud comprising second data points characterizing spatial attributes of at least said coated portion and said reference portion; and a computer comprising a processor programmed with a set of instructions that, when executed by said processor, causes said processor to:

extract a first outer boundary edge of said first point cloud representative of an outer boundary of said surface;

extract a first inner boundary edge of said first point cloud representative of an inner boundary of said surface;

extract a first reference portion subset of said first data points located between said first outer boundary edge and said first inner boundary edge and representative of said reference portion;

extract a bare portion subset of said first data points located within said first inner boundary edge and representative of said bare portion;

extract a second outer boundary edge of said second point cloud representative of said outer boundary of said surface;

extract a second inner boundary edge of said second point cloud representative of said inner boundary of said surface;

extract a second reference portion subset of said second data points located between said second outer boundary edge and said second inner boundary edge and representative of said reference portion;

extract a coated portion subset of said second data points located within said second inner boundary edge and representative of said coated portion;

register said first point cloud and said second point cloud with respect to a common reference coordinate system;

register said first reference portion subset of said first data points and said second reference portion subset of said second data points with respect to one another; and calculate difference values indicative of a thickness of said surface coating based on differences between said coated portion subset of said second data points and said bare portion subset of said first data points.

14. The apparatus of claim 13 wherein said set of instructions, when executed by said processor, further causes said processor to:

extract a first background surface subset of said first data points located outside of said first outer boundary edge and representative of a background surface; and extract a second background surface subset of said second data points located outside of said second outer boundary edge and representative of said background surface.

15. The apparatus of claim 14 wherein said set of instructions, when executed by said processor, further causes said processor to:

apply an erosion operation to said first outer boundary edge to extract said first inner boundary edge;

apply said erosion operation to said second outer boundary edge to extract said second inner boundary edge;

compute a point cloud transformation to register said first reference portion subset and said second reference portion subset relative to each other; and transform one of said first point cloud or said second point cloud by said point cloud transformation to register said bare portion subset and said coated portion subset relative to each other.

16. The apparatus of claim 14 wherein said set of instructions, when executed by said processor, further causes said processor to:

select three first reference data points from at least one of said first reference portion subset and said first background surface subset;

select three second reference data points from at least one of said second reference portion subset and said second background surface subset;

fix said first data points of said first point cloud relative to said first reference data points;

fix said second data points of said second point cloud relative to said second reference data points; and align said first reference data points and said second reference data points with a common Z-coordinate of said reference coordinate system to register said first point cloud and said second point cloud relative to a Z-axis.

17. The apparatus of claim 14 wherein said set of instructions, when executed by said processor, further causes said processor to:

generate a first reference line corresponding to a first portion of said first outer boundary edge;

generate a second reference line corresponding to a second portion of said second outer boundary edge;

fix said first data points of said first point cloud relative to said first reference line;

fix said second data points of said second point cloud relative to said second reference line; and align said first reference line and said second reference line with one of a common X-coordinate or Y-coordinate of said reference coordinate system to register said first point cloud and said second point cloud to one of an X-axis or a Y-axis.

18. The apparatus of claim 14 wherein said set of instructions, when executed by said processor, further causes said processor to:

select a first X,Y-coordinate reference point from said first data points;

select a second X,Y-coordinate reference point from said second data points;

fix said first data points of said first point cloud relative to said first X,Y-coordinate reference point;

fix said second data points of said second point cloud relative to said second X,Y-coordinate reference point; and align said first X,Y-coordinate reference point and said second X,Y-coordinate reference point with a common X-coordinate and Y-coordinate of said reference coordinate system to register said first point cloud and said second point cloud to an X-axis and a Y-axis.

19. A computer program product comprising:

a non-transitory computer readable medium; and program code, stored on said non-transitory computer readable medium, for:

acquiring a first point cloud representative of at least a bare portion of a surface of an object relative to a reference portion of said surface, said first point cloud comprising first data points characterizing spatial attributes of at least said bare portion and said reference portion;

acquiring a second point cloud representative of at least a coated portion of said surface relative to said reference portion, said coated portion comprising said bare portion covered with a surface coating, and said second point cloud comprising second data points characterizing spatial attributes of at least said coated portion and said reference portion;

extracting a first outer boundary edge of said first point cloud representative of an outer boundary of said surface;

extracting a first inner boundary edge of said first point cloud representative of an inner boundary of said surface;

extracting a first reference portion subset of said first data points located between said first outer boundary edge and said first inner boundary edge and representative of said reference portion;

extracting a bare portion subset of said first data points located within said first inner boundary edge and representative of said bare portion;

extracting a second outer boundary edge of said second point cloud representative of said outer boundary of said surface;

extracting a second inner boundary edge of said second point cloud representative of said inner boundary of said surface;

extracting a second reference portion subset of said second data points located between said second outer boundary edge and said second inner boundary edge and representative of said reference portion;

extracting a coated portion subset of said second data points located within said second inner boundary edge and representative of said coated portion;

registering said first point cloud and said second point cloud with respect to a common reference coordinate system;

registering said first reference portion subset of said first data points and said second reference portion subset of said second data points with respect to one another; and calculating difference values indicative of a thickness of said surface coating based on differences between said coated portion subset of said second data points and said bare portion subset of said first data points.

20. The computer program product of claim 19 wherein said program code, stored on said non-transitory computer readable medium, is further for:

extracting a first background surface subset of said first data points located outside of said first outer boundary edge and representative of a background surface;

extracting a second background surface subset of said second data points located outside of said second outer boundary edge and representative of said background surface;

selecting three first reference data points from at least one of said first reference portion subset and said first background surface subset;

selecting three second reference data points from at least one of said second reference portion subset and said second background surface subset;

fixing said first data points of said first point cloud relative to said first reference data points;

fixing said second data points of said second point cloud relative to said second reference data points;

aligning said first reference data points and said second reference data points with a common Z-coordinate of said reference coordinate system to register said first point cloud and said second point cloud relative to a Z-axis;

generating a first reference line corresponding to a first portion of said first outer boundary edge;

generating a second reference line corresponding to a second portion of said second outer boundary edge;

fixing said first data points of said first point cloud relative to said first reference line;

fixing said second data points of said second point cloud relative to said second reference line;

aligning said first reference line and said second reference line with one of a common X-coordinate or Y-coordinate of said reference coordinate system to register said first point cloud and said second point cloud to one of said X-axis or said Y-axis;

selecting a first X,Y-coordinate reference point from said first data points;

selecting a second X,Y-coordinate reference point from said second data points;

fixing said first data points of said first point cloud relative to said first X,Y-coordinate reference point;

fixing said second data points of said second point cloud relative to said second X,Y-coordinate reference point;

aligning said first X,Y-coordinate reference point and said second X,Y-coordinate reference point with said common X-coordinate and Y-coordinate of said reference coordinate system to register said first point cloud and said second point cloud to said X-axis and said Y-axis;

computing a point cloud transformation to register said first reference portion subset and said second reference portion subset relative to each other; and transforming one of said first point cloud or said second point cloud by said point cloud transformation to register said bare portion subset and said coated portion subset relative to each other.

\* \* \* \* \*